United States Patent
Chua et al.

(10) Patent No.: US 11,715,313 B2
(45) Date of Patent: *Aug. 1, 2023

(54) APPARATUS AND METHODS FOR EXTRACTING DATA FROM LINELESS TABLE USING DELAUNAY TRIANGULATION AND EXCESS EDGE REMOVAL

(71) Applicant: EYGS LLP, London (GB)

(72) Inventors: Freddy Chongtat Chua, Newark, CA (US); Tigran Ishkhanov, San Jose, CA (US); Nigel Paul Duffy, San Francisco, CA (US)

(73) Assignee: EYGS LLP, London (GB)

( * ) Notice: Subject to any disclaimer, the term of this patent is extended or adjusted under 35 U.S.C. 154(b) by 47 days.

This patent is subject to a terminal disclaimer.

(21) Appl. No.: 17/395,201

(22) Filed: Aug. 5, 2021

(65) Prior Publication Data
US 2021/0365678 A1  Nov. 25, 2021

Related U.S. Application Data

(63) Continuation of application No. 16/456,832, filed on Jun. 28, 2019, now Pat. No. 11,113,518.

(51) Int. Cl.
*G06V 30/412* (2022.01)
*G06V 30/414* (2022.01)
(Continued)

(52) U.S. Cl.
CPC .......... *G06V 30/412* (2022.01); *G06V 10/764* (2022.01); *G06V 10/82* (2022.01); *G06V 30/414* (2022.01)

(58) Field of Classification Search
CPC .. G06V 30/414; G06V 10/426; G06V 10/768; G06V 10/764; G06V 10/82; G06V 30/412; G06K 9/627; G06F 18/2413
See application file for complete search history.

(56) References Cited

U.S. PATENT DOCUMENTS 5,048,107 A   9/1991  Tachikawa
5,848,186 A   12/1998 Wang et al.
(Continued)

FOREIGN PATENT DOCUMENTS

AU   2018237196 A1   10/2019
EP      2154631 A2    2/2010
(Continued)

OTHER PUBLICATIONS

Li, Y. et al., "A GAN-based Feature Generator for Table Detection," 2019 International Conference on Document Analysis and Recognition (ICDAR), Conference Paper, IEEE (2019), 6 pages.
(Continued)

*Primary Examiner* — Siamak Harandi
(74) *Attorney, Agent, or Firm* — Cooley LLP

(57) ABSTRACT

A method for extracting data from lineless tables includes storing an image including a table in a memory. A processor operably coupled to the memory identifies a plurality of text-based characters in the image, and defines multiple bounding boxes based on the characters. Each of the bounding boxes is uniquely associated with at least one of the text-based characters. A graph including multiple nodes and multiple edges is generated based on the bounding boxes, using a graph construction algorithm. At least one of the edges is identified for removal from the graph, and removed from the graph to produce a reduced graph. The reduced graph can be sent to a neural network to predict row labels and column labels for the table.

20 Claims, 31 Drawing Sheets

(51) Int. Cl.
*G06V 10/764* (2022.01)
*G06V 10/82* (2022.01)

(56) References Cited

U.S. PATENT DOCUMENTS

| | | | |
|---|---|---|---|
| 5,892,843 | A | 4/1999 | Zhou et al. |
| 6,006,240 | A | 12/1999 | Handley |
| 6,735,748 | B1 | 5/2004 | Teig et al. |
| 6,757,870 | B1 | 6/2004 | Stinger |
| 7,283,683 | B1 | 10/2007 | Nakamura et al. |
| 7,548,847 | B2 | 6/2009 | Acero et al. |
| 8,165,974 | B2 | 4/2012 | Privault et al. |
| 8,731,300 | B2 | 5/2014 | Rodriguez Serrano et al. |
| 9,058,536 | B1* | 6/2015 | Yuan ............... G06V 10/22 |
| 9,172,842 | B2 | 10/2015 | Booth et al. |
| 9,235,812 | B2 | 1/2016 | Scholtes |
| 9,269,053 | B2 | 2/2016 | Naslund et al. |
| 9,342,892 | B2 | 5/2016 | Booth et al. |
| 9,348,815 | B1 | 5/2016 | Estes et al. |
| 9,875,736 | B2 | 1/2018 | Kim et al. |
| 10,002,129 | B1 | 6/2018 | D'Souza |
| 10,062,039 | B1 | 8/2018 | Lockett |
| 10,614,345 | B1 | 4/2020 | Tecuci et al. |
| 10,810,709 | B1 | 10/2020 | Tiyyagura et al. |
| 10,956,786 | B2 | 3/2021 | Tecuci et al. |
| 11,113,518 | B2 | 9/2021 | Chua et al. |
| 2003/0097384 | A1 | 5/2003 | Hu et al. |
| 2006/0288268 | A1 | 12/2006 | Srinivasan et al. |
| 2007/0041642 | A1 | 2/2007 | Romanoff et al. |
| 2007/0050411 | A1 | 3/2007 | Hull et al. |
| 2010/0174975 | A1 | 7/2010 | Mansfield et al. |
| 2011/0249905 | A1 | 10/2011 | Singh et al. |
| 2012/0072859 | A1 | 3/2012 | Wang et al. |
| 2013/0191715 | A1 | 7/2013 | Raskovic et al. |
| 2014/0223284 | A1 | 8/2014 | Rankin, Jr. et al. |
| 2015/0058374 | A1 | 2/2015 | Golubev et al. |
| 2015/0093021 | A1 | 4/2015 | Xu et al. |
| 2015/0356461 | A1 | 12/2015 | Vinyals et al. |
| 2016/0078364 | A1 | 3/2016 | Chiu et al. |
| 2016/0104077 | A1 | 4/2016 | Jackson, Jr. et al. |
| 2016/0162456 | A1 | 6/2016 | Munro et al. |
| 2016/0350280 | A1 | 12/2016 | Lavallee et al. |
| 2016/0364608 | A1 | 12/2016 | Sengupta et al. |
| 2017/0083829 | A1 | 3/2017 | Kang et al. |
| 2017/0177180 | A1 | 6/2017 | Bachmann et al. |
| 2017/0235848 | A1 | 8/2017 | Van Dusen et al. |
| 2017/0300472 | A1 | 10/2017 | Parikh et al. |
| 2017/0300565 | A1 | 10/2017 | Calapodescu et al. |
| 2018/0060303 | A1 | 3/2018 | Sarikaya et al. |
| 2018/0068232 | A1 | 3/2018 | Hari Haran et al. |
| 2018/0129634 | A1 | 5/2018 | Sivaji et al. |
| 2018/0157723 | A1 | 6/2018 | Chougule et al. |
| 2018/0181797 | A1 | 6/2018 | Han et al. |
| 2018/0203674 | A1 | 7/2018 | Dayanandan |
| 2018/0204360 | A1 | 7/2018 | Bekas et al. |
| 2019/0050381 | A1 | 2/2019 | Agrawal et al. |
| 2019/0108448 | A1 | 4/2019 | O'Malia et al. |
| 2019/0147320 | A1 | 5/2019 | Mattyus et al. |
| 2019/0171704 | A1 | 6/2019 | Buisson et al. |
| 2019/0303663 | A1 | 10/2019 | Krishnapura et al. |
| 2019/0340240 | A1 | 11/2019 | Duta |
| 2020/0073878 | A1 | 3/2020 | Mukhopadhyay et al. |
| 2020/0327373 | A1 | 10/2020 | Tecuci et al. |
| 2020/0410231 | A1 | 12/2020 | Chua et al. |
| 2021/0056429 | A1 | 2/2021 | Gangeh et al. |
| 2021/0150757 | A1 | 5/2021 | Mustikovela et al. |
| 2021/0165938 | A1 | 6/2021 | Bailey et al. |
| 2021/0166074 | A1 | 6/2021 | Tecuci et al. |
| 2021/0233656 | A1 | 7/2021 | Tran et al. |
| 2021/0240976 | A1 | 8/2021 | Tiyyagura et al. |
| 2022/0027740 | A1 | 1/2022 | Dong et al. |
| 2022/0058839 | A1 | 2/2022 | Chang et al. |
| 2022/0148242 | A1 | 5/2022 | Russell et al. |

FOREIGN PATENT DOCUMENTS

| | | |
|---|---|---|
| EP | 3742346 A2 | 11/2020 |
| WO | WO-2017163230 A1 | 9/2017 |

OTHER PUBLICATIONS

Office Action for U.S. Appl. No. 16/546,938, dated May 27, 2022, 11 pages.
Office Action for U.S. Appl. No. 16/781,195, dated Jun. 8, 2022, 29 pages.
Office Action for U.S. Appl. No. 16/781,195, dated Nov. 26, 2021, 26 pages.
Ohta, M. et al., "A cell-detection-based table-structure recognition method," Proceedings of the ACM Symposium on Document Engineering 2019, pp. 1-4.
Oro, E. et al., "PDF-TREX: An approach for recognizing and extracting tables from PDF documents," 2009 10th International Conference on Document Analysis and Recognition, pp. 906-910, IEEE, 2009.
Non-Final Office Action for U.S. Appl. No. 16/546,938 dated Sep. 12, 2022, 9 pages.
Paliwal, Shubham Singh, D. Vishwanath, Rohit Rahul, Monika Sharma, and Lovekesh Vig. "Tablenet: Deep learning model for end-to-end table detection and tabular data extraction from scanned document images." International Conference on Document Analysis and Recognition (ICDAR), pp. 128-133. IEEE, 2019. (Year: 2019).
Rashid, Sheikh Faisal, Abdullah Akmal, Muhammad Adnan, Ali Adnan Aslam, and Andreas Dengel. "Table recognition in heterogeneous documents using machine learning." In 2017 14th IAPR International conference on document analysis and recognition (ICDAR), vol. 1, pp. 777-782. IEEE, 2017. (Year: 2017).
Babatunde, F. F. et al., "Automatic Table Recognition and Extraction from Heterogeneous Documents," Journal of Computer and Communications, vol. 3, pp. 100-110 (Dec. 2015).
Dong, C. et al., "Image Super-Resolution Using Deep Convolutional Networks," arXiv:1501.00092v3 [cs.CV], Jul. 31, 2015, Retrieved from the Internet: URL: https://arxiv.org/pdf/1501.00092.pdf, 14 pages.
Dong, R. et al., "Multi-input attention for unsupervised OCR correction," Proceedings of the 56th Annual Meetings of the Association for Computational Linguistics (Long Papers), Melbourne, Australia, Jul. 15-20, 2018, pp. 2363-2372.
Eskenazi, S. et al., A comprehensive survey of mostly textual document segmentation algorithms since 2008, Pattern Recognition, vol. 64, Apr. 2017, pp. 1-14.
Fan, M. et al., "Detecting Table Region in PDF Documents Using Distant Supervision," arXiv:1506.08891v6 [cs.CV], Sep. 22, 2015, Retrieved from the Internet: URL: https://arxiv.org/pdf/1506.08891v6.pdf, 7 pages.
Gangeh, M. J. et al., "Document enhancement system using autoencoders," 33rd Conference on Neural Information Processing Systems (NeurIPS 2019), Vancouver, Canada, Nov. 2019, Retrieved from the Internet:: URL:https://openreview.net/pdf?id=S1Mnzp9qLB, 4 pages.
Hakim, S. M. A. et al., "Handwritten bangla numeral and basic character recognition using deep convolutional neural network," 2019 International Conference on Electrical, Computer and Communication Engineering (ECCE), IEEE, Feb. 7-9, 2019, 6 pages.
Handley, J. C., "Table analysis for multi-line cell identification," Proceedings of SPIE, vol. 4307, Jan. 2001, pp. 34-43.
Hanifah, L. et al., "Table Extraction from Web Pages Using Conditional Random Fields to Extract Toponym Related Data," Journal of Physics: Conference Series, vol. 801, Issue 1, Article ID 012064, Jan. 2017, 8 pages.
Harit, G. et al., "Table Detection in Document Images using Header and Trailer Patterns," ICVGIP '12, Dec. 16-19, 2012, Mumbai, India, 8 pages.
Howard, J. et al., "Universal Language Model Fine-tuning for Text Classification," arXiv:1801.06146v5 [cs.CL], May 23, 2018, Retrieved from the Internet: URL: https://arxiv.org/pdf/1801.06146.pdf, 12 pages.

(56) References Cited

OTHER PUBLICATIONS

International Search Report and Written Opinion for International Application No. PCT/EP2020/076042, dated Jan. 12, 2021, 11 pages.
International Search Report and Written Opinion for International Application No. PCT/EP2021/052579, dated May 10, 2021, 15 pages.
International Search Report and Written Opinion for International Application No. PCT/US2020/027916, dated Jul. 21, 2020, 16 pages.
International Search Report and Written Opinion for International Application No. PCT/US2020/039611, dated Oct. 13, 2020, 12 pages.
International Search Report and Written Opinion for International Application No. PCT/US2020/046820, dated Nov. 11, 2020, 13 pages.
Isola, P. et al., "Image-to-Image Translation with Conditional Adversarial Networks," arXiv:1611.07004v3 [cs.CV] Nov. 26, 2018, Retrieved from the Internet: URL: https://arxiv.org/pdf/1611.07004.pdf, 17 pages.
Kasar, T. et al., "Learning to Detect Tables in Scanned Document Images Using Line Information," ICDAR '13: Proceedings of the 2013 12th International Conference on Document Analysis and Recognition, Aug. 2013, Washington, DC, pp. 1185-1189.
Kavasidis, I. et al., "A Saliency-based Convolutional Neural Network for Table and Chart Detection in Digitized Documents," arXiv:1804.06236v1 [cs.CV], Apr. 17, 2018, Retrieved from the Internet: URL: https://arxiv.org/pdf/1804.06236.pdf, 13 pages.
Kharb, L. et al., "Embedding Intelligence through Cognitive Services," International Journal for Research in Applied Science & Engineering Technology (IJRASET), ISSN: 2321-9653; IC Value: 45.98; SJ Impact Factor:6.887, vol. 5, Issue XI, Nov. 2017, pp. 533-537.
Kise, K. et al., "Segmentation of Page Images Using the Area Voronoi Diagram," Computer Vision and Image Understanding, vol. 70, No. 3, Jun. 1998, pp. 370-382.
Klampfl, S. et al., "A Comparison of Two Unsupervised Table Recognition Methods from Digital Scientific Articles," D-Lib Magazine, vol. 20, No. 11/12, Nov./Dec. 2014, DOI:10.1045/november14-klampfl, 15 pages.
Le Vine, N. et al., "Extracting tables from documents using conditional generative adversarial networks and genetic algorithms," IJCNN 2019 International Joint Conference on Neural Networks, Budapest, Hungary, Jul. 14-19, 2019, pp. 1-8.
Lehtinen, J. et al., "Noise2Noise: Learning Image Restoration without Clean Data," Proceedings of the 35th International Conference on Machine Learning, Stockholm, Sweden, PMLR 80, Jul. 10-15, 2018, Retrieved from the Internet: URL: http://proceedings.mlr.press/v80/lehtinen18a/lehtinen18a.pdf, 10 pages.
Mac, A. J. et al., "Locating tables in scanned documents for reconstructing and republishing," arXiv:1412.7689 [cs.CV], Dec. 2014, The 7th International Conference on Information and Automation for Sustainability (ICIAfS) 2014, 6 pages.
Mao, X-J. et al., "Image Restoration Using Convolutional Autoencoders with Symmetric Skip Connections," arXiv:1606.08921v3 [cs.CV], Aug. 30, 2016, Retrieved from the Internet: URL: https://arxiv.org/abs/1606.08921, 17 pages.
Mao, X-J. et al., "Image Restoration Using Very Deep Convolutional Encoder-Decoder Networks with Symmetric Skip Connections," 30th Conference on Neural Information Processing Systems (NIPS 2016), Barcelona, Spain, Retrieved from the Internet: URL: https://papers.nips.cc/paper/6172-image-restoration-using-very-deep-convolutional-encoder-decoder-networks-with-symmetric-skip-connections.pdf, 9 pages.
Office Action for U.S. Appl. No. 16/382,707, dated Sep. 4, 2019, 11 pages.
Office Action for U.S. Appl. No. 16/456,832, dated Nov. 6, 2020, 18 pages.
Office Action for U.S. Appl. No. 16/790,945, dated Jul. 29, 2020, 13 pages.
Oliveira, H. et al., "Assessing shallow sentence scoring techniques and combinations for single and multi-document summarization," Expert Systems With Applications, vol. 65 (Dec. 2016) pp. 68-86.
Paladines, J. et al., "An Intelligent Tutoring System for Procedural Training with Natural Language Interaction," Conference Paper, DOI: 10.5220/0007712203070314, Jan. 2019, 9 pages.
Pellicer, J. P., "Neural networks for document image and text processing," PhD Thesis, Universitat Politecnica de Valencia, Sep. 2017, 327 pages.
Pinto, D. et al., "Table extraction using conditional random fields," Proceedings of the 26th Annual International ACM SIGIR Conference on Research and Development in Information Retrieval (SIGIR '03), ACM, New York, NY, USA, pp. 235-242. DOI=http://dx.doi.org/10.1145/860435.860479 (2003), 8 pages.
Qasim, S. R. et al., "Rethinking Table Parsing using Graph Neural Networks," arXiv:1905.1339lvl [cs.CV]; 2019 International Conference on Document Analysis and Recognition (ICDAR), Sydney, Australia, 2019, pp. 142-147.
Schreiber, S. et al., "DeepDeSRT: Deep Learning for Detection and Structure Recognition of Tables in Document Images," 2017 14th IAPR International Conference on Document Analysis and Recognition (ICDAR) Nov. 9-15, 2017, Retrieved from the Internet: https://www.dfki.de/fileadmin/user_upload/import/9672_PID4966073.pdf, 6 pages.
Staar, P. W. J. et al., "Corpus conversion service: A machine learning platform to ingest documents at scale," Applied Data Science Track Paper, KDD 2018, Aug. 19-23, 2018, London, United Kingdom, pp. 774-782.
Vincent, P. et al., "Extracting and composing robust features with denoising autoencoders," in Proceedings of the 25th International Conference on Machine Learning, Helsinki, Finland, 2008, 8 pages.
Wiraatmaja, C. et al., "The Application of Deep Convolutional Denoising Autoencoder for Optical Character Recognition Preprocessing," 2017 International Conference on Soft Computing, Intelligent System and Information Technology (ICSIIT), IEEE, Sep. 2017, pp. 72-77.
Xiang, R., Research Statement, Aug. 2018, 6 pages.
Xiao, Y. et al., "Text region extraction in a document image based on the Delaunay tessellation," Pattern Recognition, vol. 36, No. 3, Mar. 2003, pp. 799-809.
Notice of Allowance for U.S. Appl. No. 16/781,195m dated Feb. 1, 2023, 10 pages.
Sun N., et al., "Faster R-CNN Based Table Detection Combining Corner Locating," 2019 International Conference on Document Analysis and Recognition (ICDAR), 2019, pp. 1314-1319.

\* cited by examiner

APPARATUS AND METHODS FOR EXTRACTING DATA FROM LINELESS TABLE USING DELAUNAY TRIANGULATION AND EXCESS EDGE REMOVAL

CROSS-REFERENCE TO RELATED APPLICATIONS

This application is a continuation of U.S. patent application Ser. No. 16/456,832, now U.S. Pat. No. 11,113,518, filed Jun. 28, 2019, the disclosure of which is hereby incorporated by reference in its entirety.

TECHNICAL FIELD

The present disclosure generally relates to the detection of lineless tabular data within electronic documents such as image files.

BACKGROUND

Tables are compact, efficient tools for summarizing relational information and are used in a wide variety of documents such as forms, invoices, scientific papers, newspaper articles, etc. Although the human eye can readily perceive a table within a text document, the automated/computer-based detection and understanding of tables remains challenging to implement.

SUMMARY

In some embodiments, a method for extracting data from lineless tables includes storing an image including a table in a memory. A processor operably coupled to the memory identifies multiple text-based characters in the image, and defines multiple bounding boxes based on the characters. Each of the bounding boxes is uniquely associated with at least one of the text-based characters. A graph including multiple nodes and multiple edges is generated based on the bounding boxes, using a graph construction algorithm. At least one of the edges is identified for removal from the graph, and removed from the graph to produce a reduced graph. The reduced graph can be sent to a neural network to predict row labels and column labels for the table.

In some embodiments, a method for extracting data from lineless tables includes receiving a scanned image including lineless formatted data at a processor. Multiple boundary boxes associated with the lineless formatted data are detected via optical character recognition (OCR). Based on the multiple boundary boxes and using Delaunay triangulation, a graph including multiple edges is generated. Each of the edges represents a relationship between exactly two of the boundary boxes. A first refinement of the graph is performed, to eliminate redundant representations of relationships, and to produce a first refined graph. A second refinement of the graph is performed to remove a longest edge from each triangular region from multiple triangular regions produced by the Delaunay triangulation, to produce a second refined graph. Row data and column data are predicted for the lineless formatted data using a neural network and based on the second refined graph.

In some embodiments, a method for extracting data from lineless tables includes obtaining, at a processor, a portable document format (PDF) file including formatted data. The PDF file is converted to an image file, and OCR is performed on the image file to produce a scanned file. Multiple character-level bounding boxes for the formatted data are generated based on the scanned file, and multiple word-level bounding boxes are generated for the formatted data based on the PDF file. The character-level bounding boxes and the word-level bounding boxes, collectively, form a synthetic dataset that can be used to train a neural network.

BRIEF DESCRIPTION OF THE DRAWINGS

FIG. 1 is a diagram illustrating a document with multiple fields, and a lineless table extracted therefrom, according to some embodiments.

FIG. 13 is a diagram showing word-level bounding boxes generated for a lineless table detected in a PDF file that has been OCR-processed, according to some embodiments.

FIG. 14 is a diagram showing character-level bounding boxes generated for a lineless table detected via ABBYY FineReader XML, according to some embodiments.

DETAILED DESCRIPTION

Figure 2:
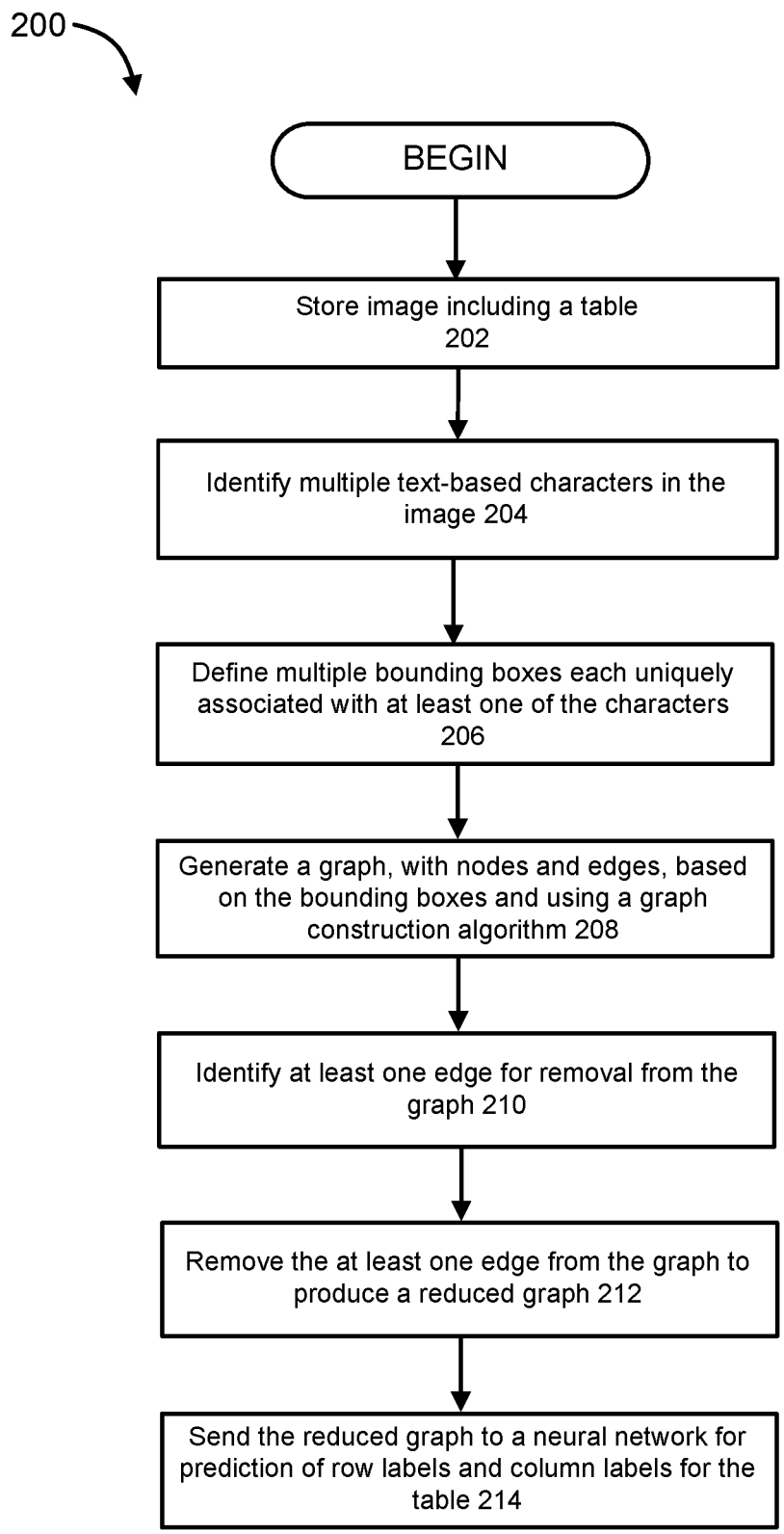
FIG. 2 is a flowchart illustrating an example method for extracting data from lineless tables, according to some embodiments.

Known methods for determining the structure of tables include processing files that are digitally-formatted, such as digital portable document format (PDF), Microsoft Word/Excel documents and other spreadsheet files, in which structured information is already explicitly stored in the saved file. In addition, some optical character recognition (OCR) software can recover characters and text (e.g., words) from an image file, but such software typically cannot determine associations among the recovered characters/text or between the recovered characters/text and locations (e.g., cells) within a table. Known methods therefore cannot process raster images or bitmaps to detect rows and columns of a lineless table.

In contrast with the foregoing, embodiments of the present disclosure can be used to extract structured information from lineless tables in scanned images. Methods set forth herein address the limitations of the known methods described above by translating lineless tables within scanned images or raster images/bitmap images into a digital form such that structural information (e.g., row and column assignments) is made available for information extraction and information retrieval. For example, in some embodiments, an image containing a table is provided to an OCR software that detects the multiple characters of the table and defines corresponding bounding boxes for the multiple characters of the table. In tables, each row typically represents a line item of interest having multiple associated properties divided among different columns. For example, a table may contain column headings such as: item id, item description, and item cost (e.g., for documents that are receipts or invoices). Since methods of the present disclosure facilitate the identification of relationships/associations among subsets (e.g., fields, cells, etc.) of table data, the methods may be viewed as an extension of the functionality of known OCR software.

As used herein, a "lineless table" refers to tabular data (i.e., text-based data/information that is arranged in rows and columns or any other organized arrangement) that either does not include any lines or other graphical features (e.g., dividers, symbols, differences in font, etc.) that serve as a "guide to the eye" and to demarcate boundaries between rows, columns, or other sub-section of the arranged data, or that includes only a partial set of one or more such lines or other graphical features (e.g., tabular data that: is surrounded by an outer box/border but otherwise includes no lines, or includes lines separating columns but no lines separating rows, or includes an outer box/border and lines separating columns but no lines separating rows, or includes lines separating rows but no lines separating columns, or includes an outer box/border and lines separating rows but no lines separating columns, or includes lines separating only a subset of the columns and/or includes lines separating only a subset of the rows, or includes an outer box/border and lines separating only a subset of the columns and/or includes an outer box/border and lines separating only a subset of the rows). Table data can include words, letters, numbers, special characters, equations, etc.

Images that can include lineless tables and that are suitable for processing by systems and methods set forth herein can include one or more of the following, by way of example only: digital graphics files such as raster images (i.e., pixel-based images), vector graphics (i.e., graphics based on mathematical formulas defining geometric polygons such as polygons, lines, curves, circles and rectangles), raster graphics, bitmap images, bitmaps, dot matrix data structures, etc.

In some embodiments, an image (e.g., a raster image) containing a lineless table is read/scanned to detect (1) multiple characters/words, and (2) the row and column associated with each of the characters/words. The row and column positions/boundaries are detected or inferred without the use of explicit table lines and without the presence of structural information in the softcopy or digital form. Bounding boxes for each of the characters/words can also be detected, where each bounding box has two associated pairs of x-y coordinates, for example corresponding to the top left corner and the bottom right corner of that bounding box. In some implementations, each bounding box is converted into a node/vertex having a pair of (x,y) coordinates based on the midpoint of that bounding box. As such, a set of vertices can be detected for the bounding boxes.

A mathematical graph can be generated/constructed from the set of vertices that represents the set of characters/words from the image, for example using an algorithm such as a Delaunay triangulation algorithm. The graph can include connection lines (also referred to herein as "edges") between neighboring vertices (also referred to herein as "nodes") such that the graph reflects the topology and shape of the arrangement of vertices. Once the graph has been generated, one or more refinement processes can be performed, for example to remove excess or unnecessary edges from the graph, thereby producing a graph having a reduced number of edges and/or nodes (i.e., a "reduced graph").

In some embodiments, each edge in the graph is assigned two labels (e.g., using machine learning) for use in the prediction of row assignment (a "same-row label") and column assignment (a "same-column label"). The same-row label indicates whether the pair of nodes are in the same row, and the same-column label indicates whether the pair of nodes are in the same column. In other words, the label data includes/represents row and column information for each of the bounding boxes. If both labels are true, the pair of nodes are in the same cell. After label assignment has been completed, rows of the table can be detected by removing, from the graph, edges for which the same-row label is negative, and columns of the table can be detected by removing, from the graph, edges for which the same-column label is negative.

In some embodiments, the assignment of the labels is based on all or any subset of: a distance between the features representing the pair of nodes connected to each edge; edges that are detected to be at least partially aligned along a horizontal direction of the graph, e.g., for consideration in the prediction/determination of the same-row label; edges that are detected to be at least partially aligned along a vertical direction of the graph, e.g., for consideration in the prediction/determination of the same-column label; and a determination of whether there is a visible line or other graphical feature within the image that intersects or otherwise coincides/overlaps with the edge. All or a subset of the foregoing features can be sent to a machine learning model for use in training the machine learning model based on a corresponding set of labeled data. In some implementations, a training inference/prediction phase can use a priori knowledge to train a neural network. Although some embodiments are shown and described herein as identifying rows and columns based on edges of the generated graphs, in other embodiments, rows and columns can instead be identified as such based on row and column indices of the nodes. Embodiments set forth herein can be particularly useful, for example, in extracting information from tables in scanned images that cannot be OCR' ed.

Figure 1:
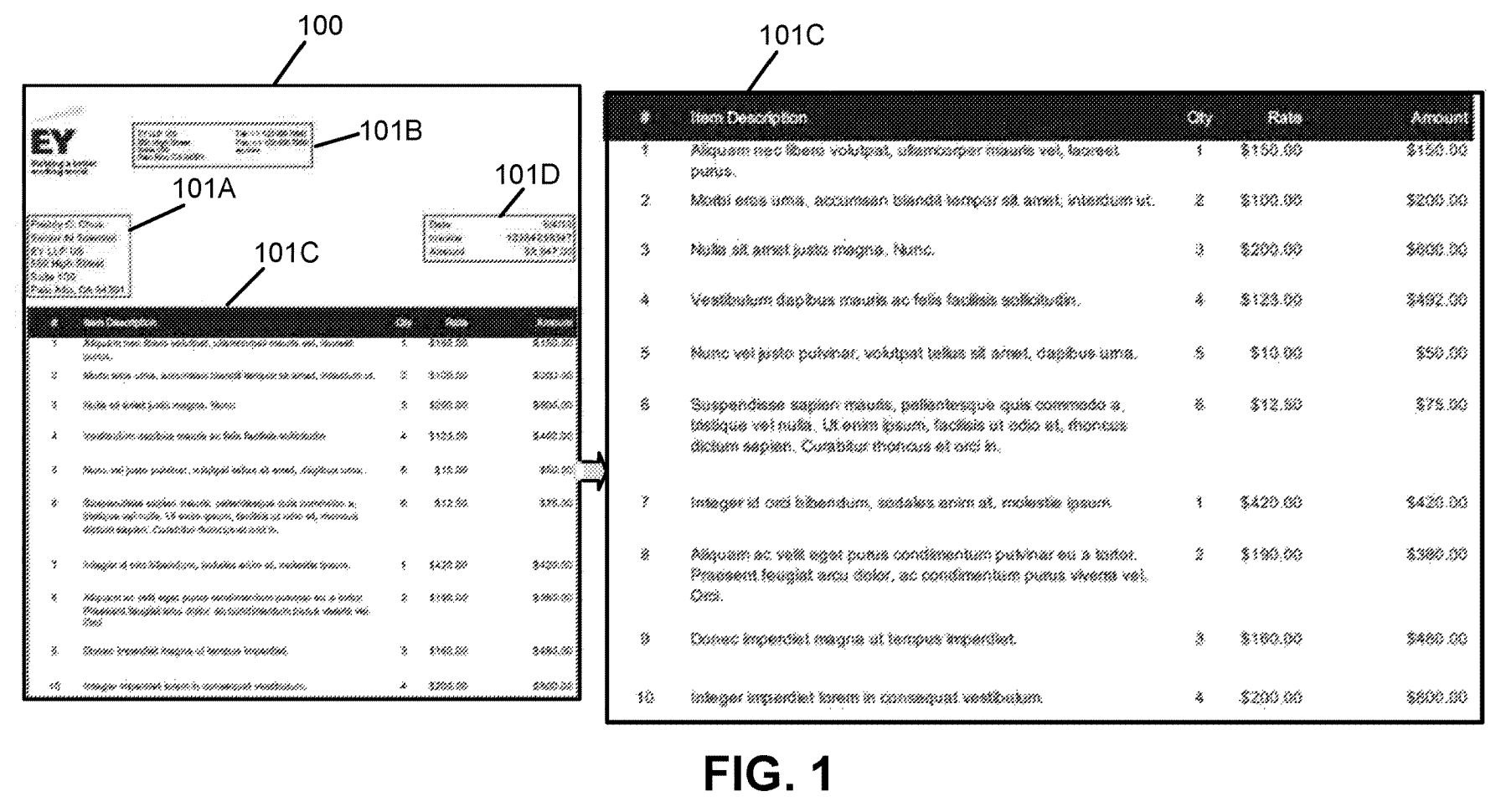

FIG. 1 is a diagram illustrating a document 100 (in this case, an invoice) with multiple fields 101A-101D, and a lineless table 101C extracted therefrom, according to some embodiments. The lineless table 101C can be detected (e.g., based on one or more rules) within the document 100 and extracted based on a detection of boundaries of the table and/or the relative size of the various fields 101A-101D of the document 100. For example, a rule for detecting the lineless table can include selection of a largest detected object within the subject document being analyzed. Alternatively or in addition, semantic segmentation of the document or comparison of the document to a template can be performed.

FIG. 2 is a flowchart illustrating an example method for extracting data from lineless tables, using character-level bounding boxes, according to some embodiments. As shown in FIG. 2, the method 200 includes storing (e.g., in a local memory) an image including a table at 202, and identifying, at 204 and via a processor operably coupled to the memory, multiple text-based characters in the image. At 206, the processor defines multiple bounding boxes based on the characters. Each bounding box from the multiple bounding boxes can be uniquely associated with at least one text-based character from the multiple text-based characters. At 208, a graph is generated via the processor. The graph includes multiple nodes and multiple edges, based on the bounding boxes, using a graph construction algorithm (e.g., Delaunay triangulation). Generating the graph can include generating each node from the multiple nodes based on a midpoint of an associated bounding box from the multiple bounding boxes. At 210, the processor identifies at least one edge from the multiple edges for removal from the graph, and the identified at least one edge is removed from the graph by the processor, at 212, to produce a reduced graph. The reduced graph is sent to a neural network (e.g., a multilayer perceptron (MLP)), at 214, for use in the prediction of multiple row labels and multiple column labels for the table. Although not shown in FIG. 2, in some implementations, the method 200 also includes receiving the multiple predicted row labels and the multiple predicted column labels for the table from the neural network. The method 200 can also include generating at least one format line for the table based on the multiple predicted row labels and/or the multiple predicted column labels. A format line can be any graphical object (e.g., a divider, a symbol, an array or arrangement of symbols, etc.) suitable for insertion into a lineless table to visually separate adjacent columns or adjacent rows and/or to demarcate a boundary of a row or a boundary of a column. Format lines can be vertically-oriented, horizontally-oriented, or oriented at an angle, depending on the overall structure or organization of the lineless table.

Figure 3:
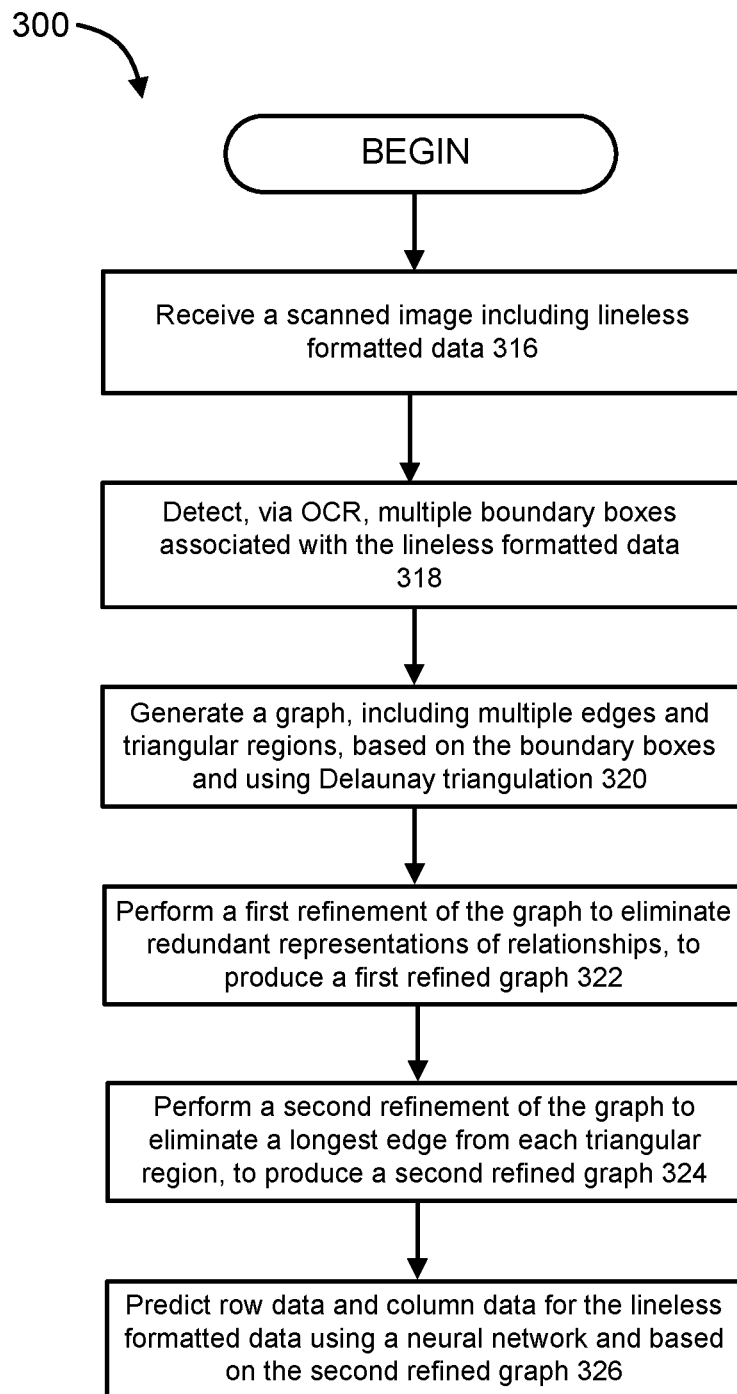
FIG. 3 is a flowchart illustrating an example method for extracting data from lineless tables, according to some embodiments.

FIG. 3 is a flowchart illustrating an example method for extracting data from lineless tables, using OCR-detected boundary boxes and Delaunay triangulation, according to some embodiments. As shown in FIG. 3, the method 300 includes receiving, at 316 and via a processor, a scanned image including lineless formatted data. Multiple boundary boxes associated with the lineless formatted data are detected, via OCR, at 318. At 320, a graph is generated based on the multiple boundary boxes and using Delaunay triangulation. The graph includes multiple edges, each representing a relationship between exactly two boundary boxes from the multiple boundary boxes. A first refinement of the graph is performed, at 322 and via the processor, to eliminate redundant representations of relationships, to produce a first refined graph, and a second refinement of the graph is performed, at 324, to remove a longest edge from each triangular region from multiple triangular regions produced by the Delaunay triangulation, to produce a second refined graph. Row data and column data for the lineless formatted data are then predicted, at 326, using a neural network and based on the second refined graph. The prediction of the row data can include predicting a row of the lineless formatted data based on a property (e.g., one or more of: an x-coordinate, a y-coordinate, a length thereof, a distance from a nearest neighboring edge, a distance between a node thereof and at least one nearest neighbor node, etc.) of at least one horizontally-oriented edge from the multiple edges. The prediction of the column data can include predicting a column of the lineless formatted data based on a property of at least one vertically-oriented edge from the multiple edges. Although not shown in FIG. 3, in some implementations, the method 300 also includes generating at least one format line for the scanned image based on the predicted row data and column data. Alternatively or in addition, the method 300 can include generating a pair of format classification labels for each edge from the multiple edges based on the predicted row data and column data, each pair of format classification labels representing whether or not the two boundary boxes associated with that edge are in a common row or a common column. Alternatively or in addition, the method 300 can include generating format classification labels for each edge from the multiple edges using statistical prediction, the format classification labels representing whether or not the two boundary boxes associated with that edge are in a common row or a common column. Alternatively or in addition, the method 300 can include generating format classification labels for each edge from the multiple edges based at least on a length of that edge. Alternatively or in addition, the method 300 can include generating format classification labels for each edge from the multiple edges based at least on a neighborhood of that edge; the neighborhood is defined based on an adjacency and/or overlap between that edge and another edge from the multiple edges.

Figure 4:
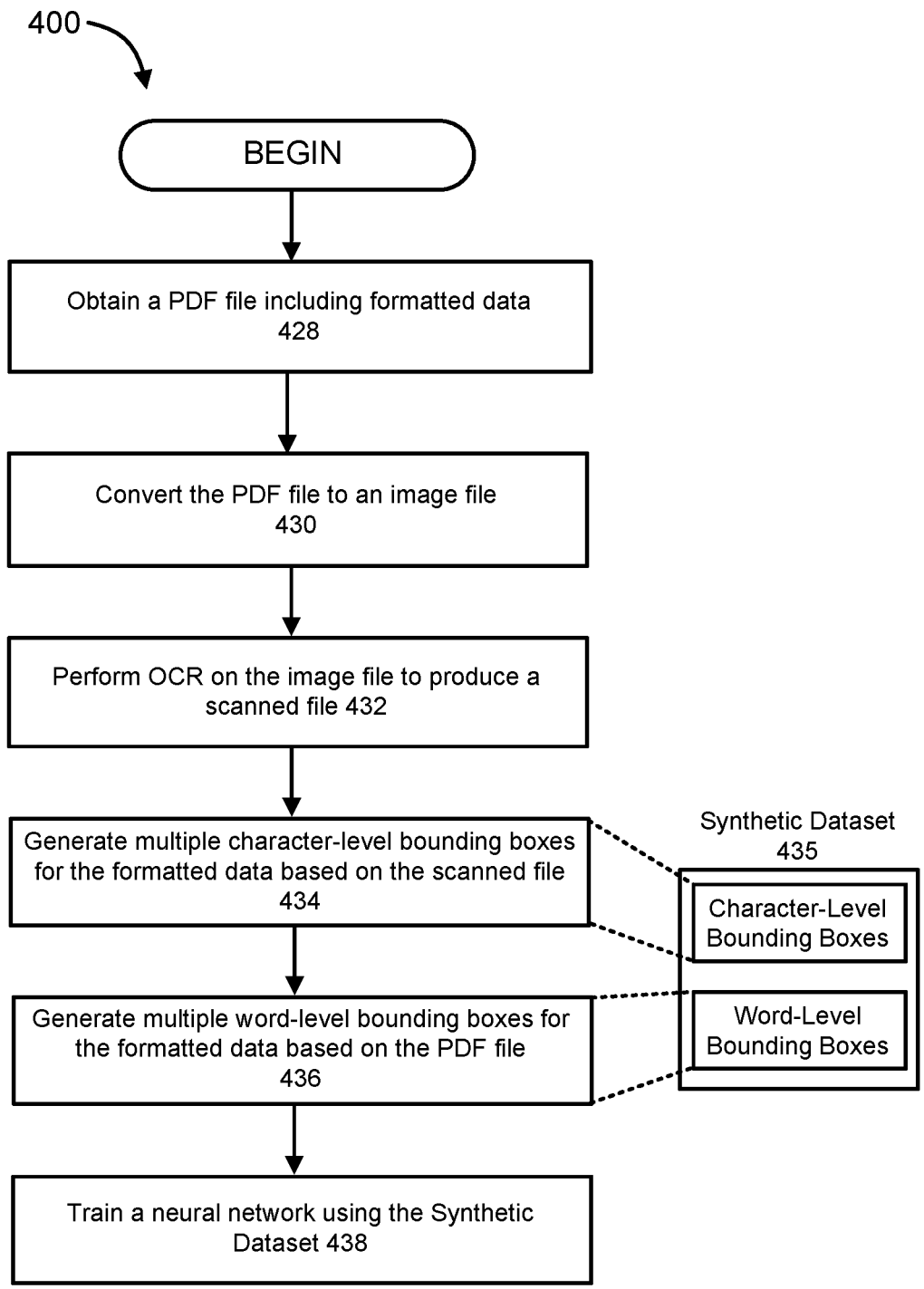
FIG. 4 is a flowchart illustrating an example method for extracting data from lineless tables, according to some embodiments.

FIG. 4 is a flowchart illustrating an example method for extracting data from lineless tables using character-level and word-level bounding boxes (collectively, a "synthetic dataset"), and using the data to train a neural network, according to some embodiments. As shown in FIG. 4, the method 400 includes obtaining, at 428 and via a processor, a portable document format (PDF) file including formatted data. At 430, the PDF file is converted, via the processor, to an image file. OCR is performed on the image file, at 432 and via the processor, to produce a scanned file. Multiple character-level bounding boxes are generated, at 434 and via the processor, for the formatted data based on the scanned file. Multiple word-level bounding boxes are generated, at 436 and via the processor, for the formatted data based on the PDF file. The multiple character-level bounding boxes and the multiple word-level bounding boxes collectively form a synthetic dataset 435. A neural network is then trained, at 438, using the synthetic dataset. Although not shown in FIG. 4, in some implementations, the method 400 also includes comparing the multiple character-level bounding boxes to the multiple word-level bounding boxes, generating multiple row labels for the formatted data based on the comparison of the multiple character-level bounding boxes to the multiple word-level bounding boxes, and generating multiple column labels for the formatted data based on the comparison of the multiple character-level bounding boxes to the multiple word-level bounding boxes. Alternatively or in addition, the method 400 can include predicting at least one of a row membership or a column membership for each word from multiple words associated with the word-level bounding boxes of the synthetic dataset, using a machine learning classifier. Alternatively or in addition, the method 400 can include generating a graph including multiple nodes and a multiple edges, based on the character-level bounding boxes and/or the word-level bounding boxes, using a graph construction algorithm (e.g., Delaunay triangulation). Alternatively or in addition, the method 400 can include generating a graph including multiple nodes and multiple edges, and generating format classification labels for each edge from the multiple edges based at least on a neighborhood of that edge; the neighborhood is defined based on an adjacency and/or overlap between that edge and another edge from the multiple edges.

Figure 5:
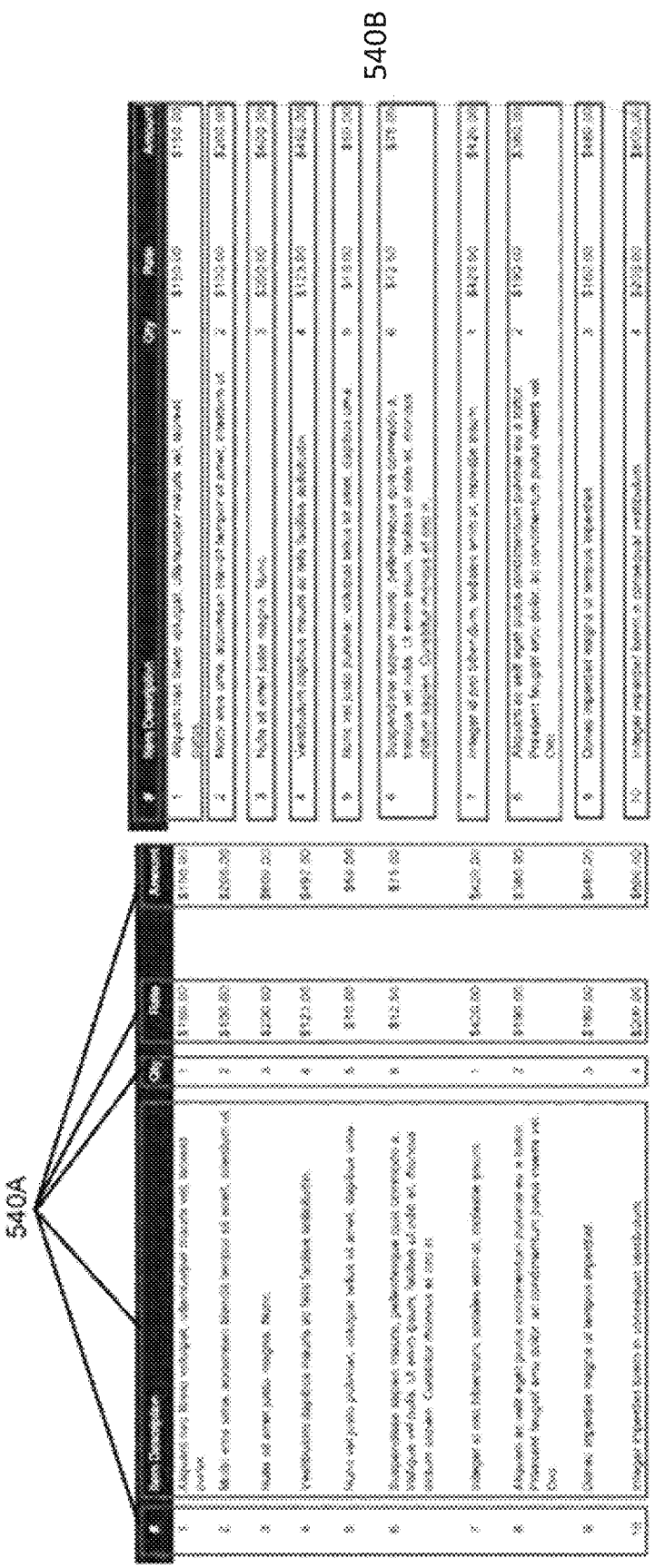
FIG. 5 includes diagrams showing column and row organization within a lineless table, according to some embodiments.
Figure 6:
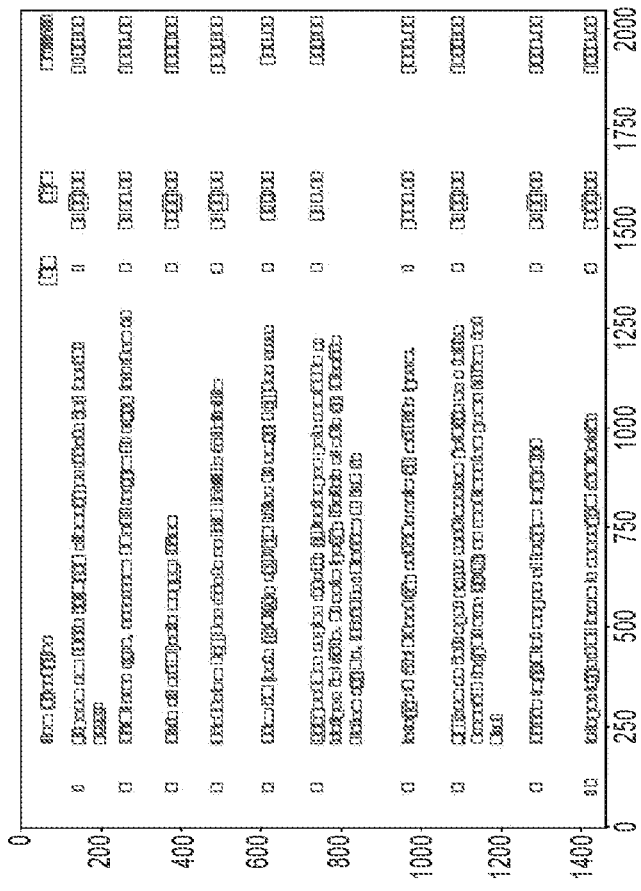
FIG. 6 includes diagrams showing the lineless table of FIG. 5 and a corresponding arrangement of identified bounding boxes (also referred to herein as "boundary boxes"), according to some embodiments.

FIG. 5 includes diagrams showing the organization of columns (540A) and rows (540B) within the lineless table 101C of FIG. 1, according to some embodiments. In some implementations, a document is predefined to include a single table. Alternatively or in addition, the positioning (e.g., the boundaries) of a table within a document or image file are predefined. For example, metadata associated with a document or image file can include table position data. FIG. 6 includes diagrams showing the lineless table of FIG. 5 (642A) and a corresponding arrangement 642B of identified character-level bounding boxes (also referred to herein as "boundary boxes"), e.g., using a process such as step 206 of process 200 in FIG. 2, according to some embodiments. The bounding boxes are defined, for example, in a manner similar to that of step 206 of the process 200 of FIG. 2 or step 318 of the process 300 of FIG. 3. For example, bounding boxes can be identified/defined using a bounding.box function, the cv2.boundingRect( ) function of OpenCV, etc.

Figure 7:
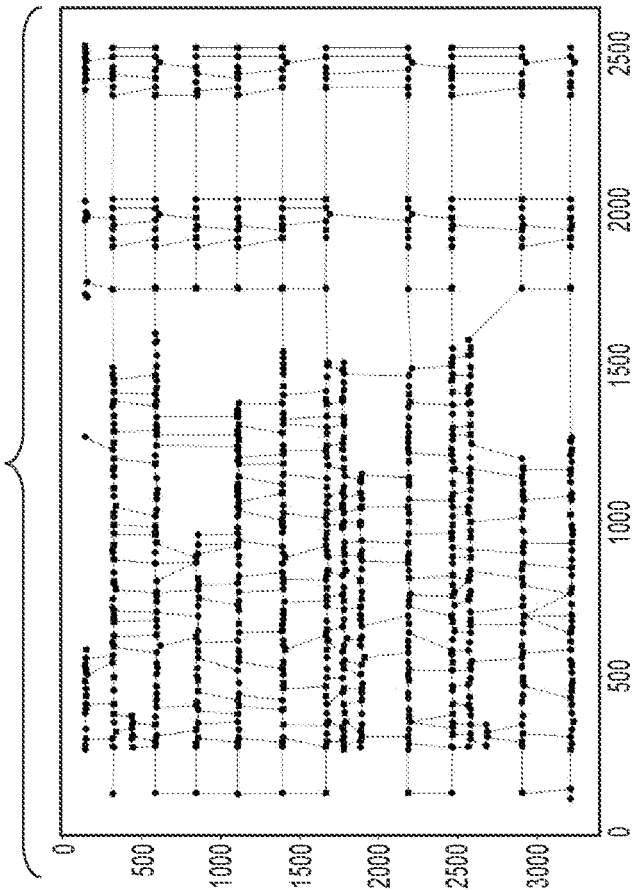
FIG. 7 includes diagrams showing the lineless table of FIG. 5 and a corresponding graph including nodes and edges, according to some embodiments.

FIG. 7 includes diagrams showing the lineless table of FIG. 5 (642A) and a corresponding graph 644 including nodes and edges (e.g., using a process such as step 208 of process 200 in FIG. 2), according to some embodiments. Each of the edges of the graph 644 connects two nodes (i.e., a pair of nodes), and can have two associated labels that indicate whether the pair of nodes share a common row or a common column. The graph 644 can be generated based on the bounding boxes of FIG. 6 (e.g., a center point or vertex/corner of each bounding box can correspond to a node in the graph) and using an algorithm such as Delaunay triangulation. The labels can be determined using statistical prediction via a neural network, discussed further herein.

Figure 8:
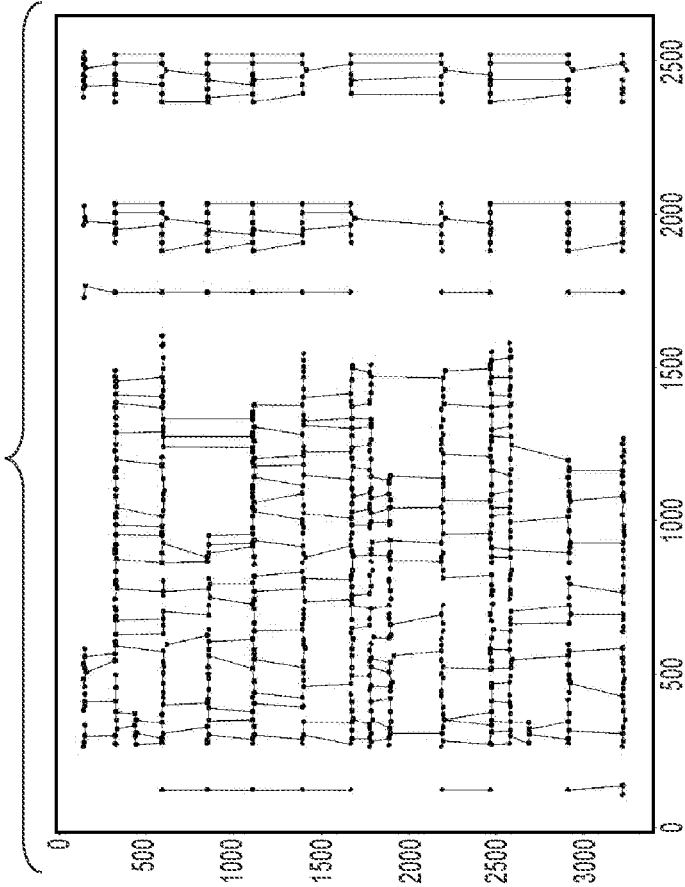
FIG. 8 includes diagrams showing the lineless table of FIG. 5 and a corresponding reduced version of the graph of FIG. 7 based on column labels, according to some embodiments.

FIG. 8 includes diagrams showing the lineless table of FIG. 5 (642A) and a corresponding reduced version (646) of the graph of FIG. 7 based on column labels, e.g., generated using a process such as steps 210 and 212 of process 200 in FIG. 2, according to some embodiments. The reduced graph 646 can be generated as follows: if an edge connecting two nodes is determined to be between nodes of a common column (e.g., based on the "same-column" label thereof having a value of "true"), that edge is retained. If the edge is determined to be positioned between nodes that do not share a common column (e.g., based on the "same-column" label thereof having a value of "negative"), it is deleted.

Figure 9:
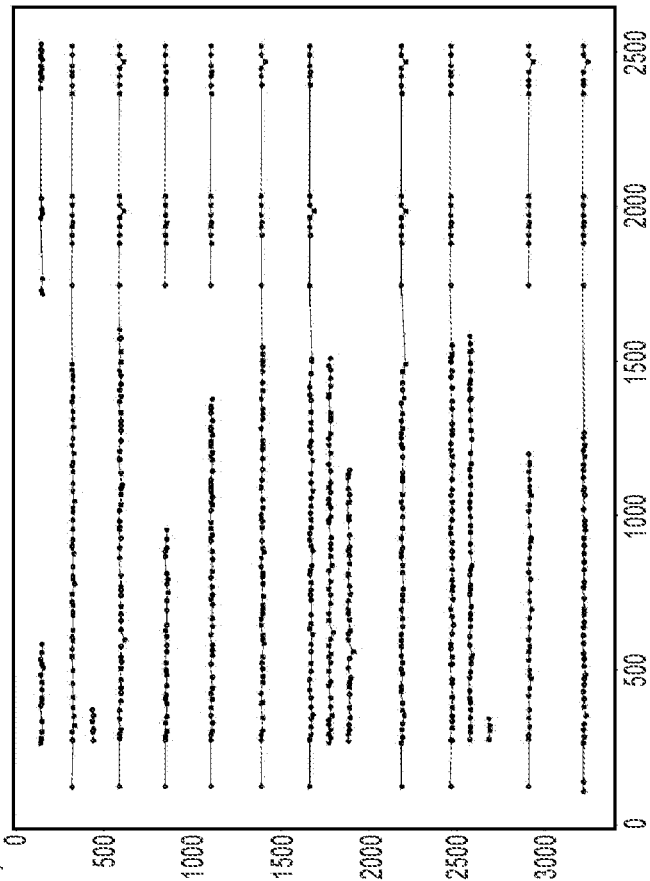
FIG. 9 includes diagrams showing the lineless table of FIG. 5 and a corresponding reduced version of the graph of FIG. 7 based on row labels, according to some embodiments.

FIG. 9 includes diagrams showing the lineless table of FIG. 5 (642A) and a corresponding reduced version (648) of the graph of FIG. 7 based on row labels, e.g., generated using a process such as steps 210 and 212 of process 200 in FIG. 2, according to some embodiments. The reduced graph 648 can be generated as follows: if an edge connecting two nodes is determined to be between nodes of a common row (e.g., based on the "same-row" label thereof having a value of "true"), that edge is retained. If the edge is determined to be positioned between nodes that do not share a common row (e.g., based on the "same-row" label thereof having a value of "negative"), it is deleted.

Figure 10:
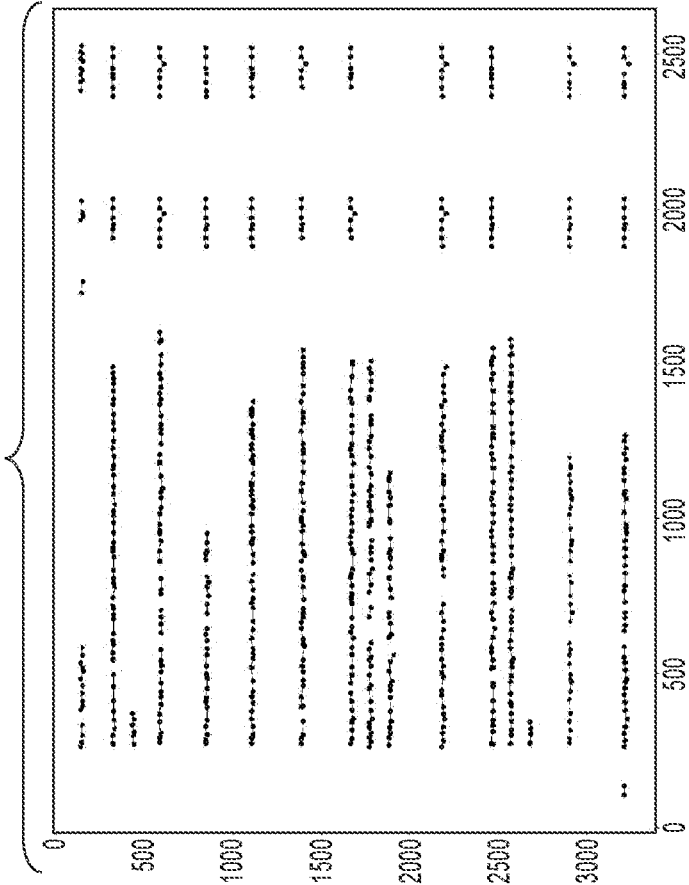
FIG. 10 includes diagrams showing the lineless table of FIG. 5 and a corresponding reduced version of the graph of FIG. 7 based on detection of rows without using an attention mechanism, according to some embodiments.

FIG. 10 includes diagrams showing the lineless table of FIG. 5 (642A) and a corresponding reduced version (650) of the graph of FIG. 7 also based on detection of rows (similar to 648 in FIG. 9) but without using an attention mechanism, according to some embodiments.

Figure 11:
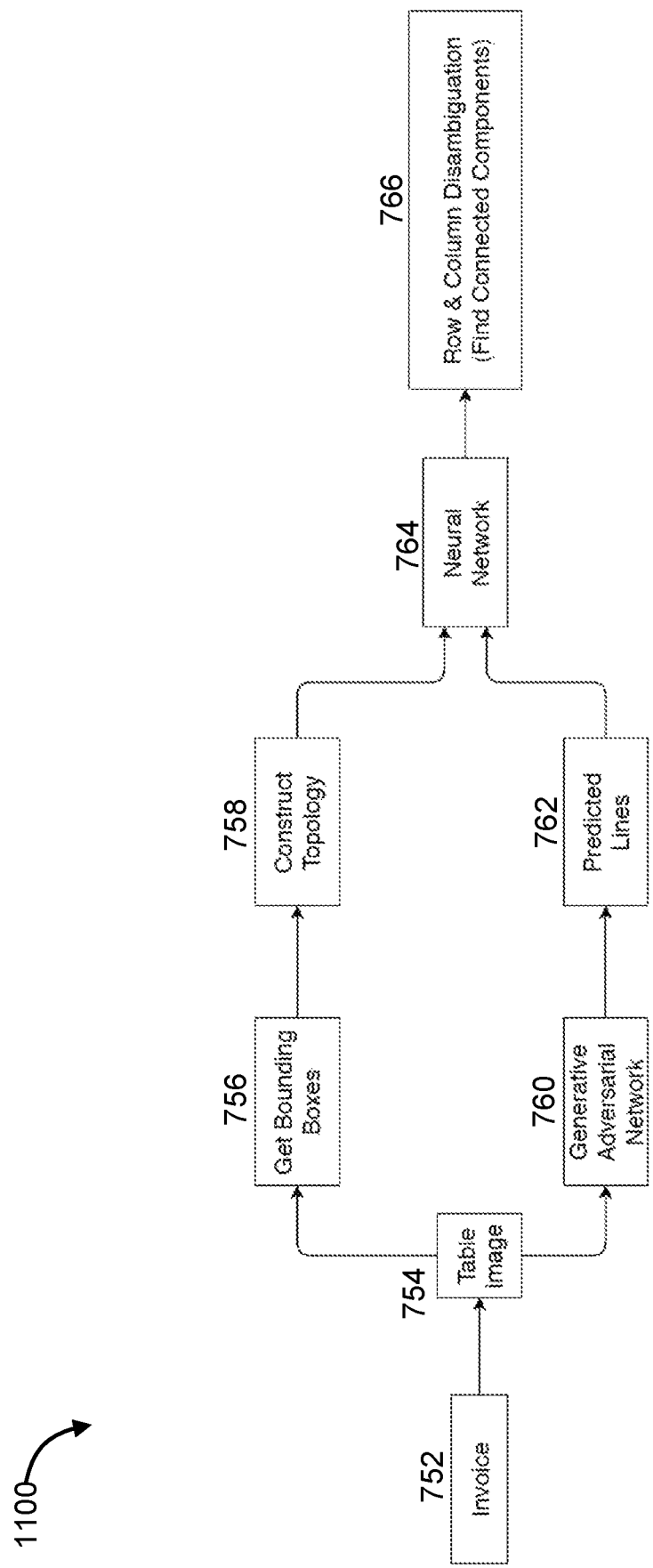
FIG. 11 is a flowchart showing a process for end-to-end table detection using a neural network, according to some embodiments.

FIG. 11 is a flowchart showing a process for end-to-end table detection using a neural network, according to some embodiments. As shown in FIG. 11, the process 1100 begins with an invoice 752 (e.g., the invoice 100 of FIG. 1), and an image including a table 754 is extracted from the invoice 752. Following the upper path, bounding boxes are detected at 756 based on the table image 754, and a graph or topology including edges and nodes is constructed at 758 based on the bounding boxes obtained at 756. Following the lower path, the image including the table 754 is provided to a generative adversarial network (GAN) at 760, and predicted lines 762 for the table are output from the GAN. Steps 760 and 762 can be performed in parallel with, or substantially in parallel with, steps 756 and 758. The predicted lines generated at 762 and the graph/topology generated at 758 are fed to a neural network 764 for prediction and to determine labels for assignment to the edges of the graph (i.e., the edges that connect the nodes of the graph). Row and column detection/disambiguation is then performed, at 766, for example based on connectivity between components such as the nodes and edges of the graph generated at 758 and the predicted lines generated at 762.

Figure 12:
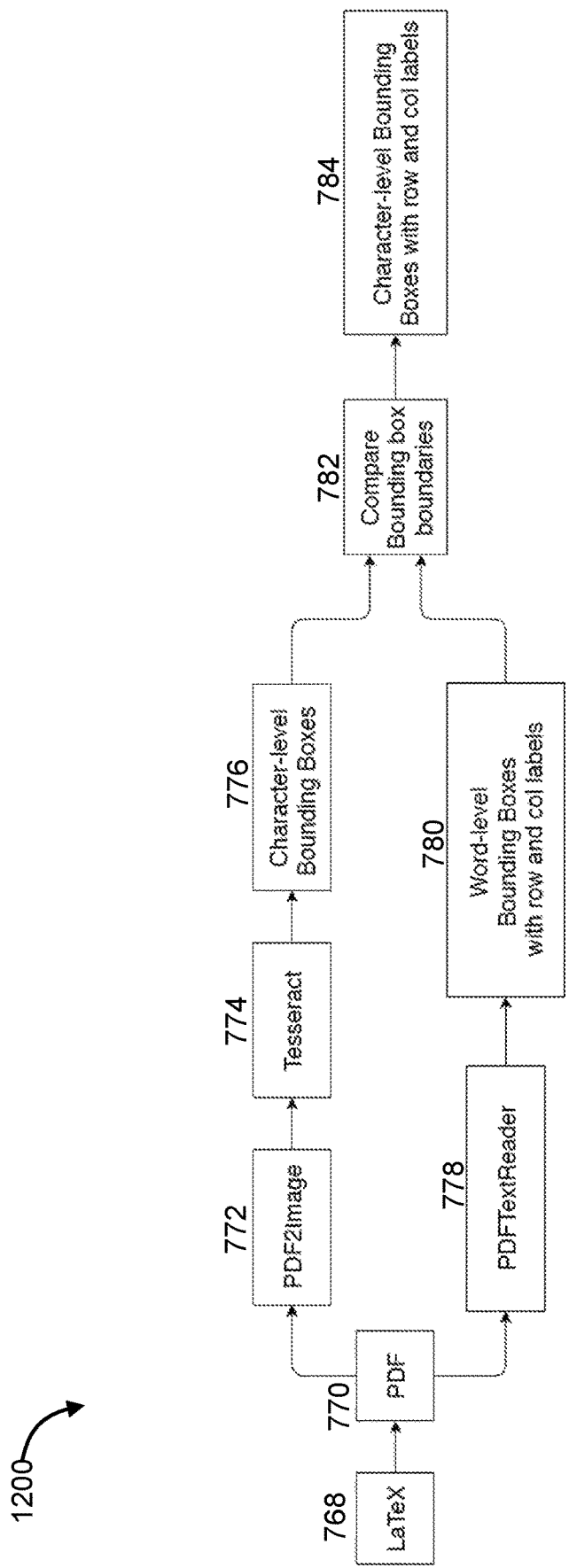
FIG. 12 is a flowchart showing a process for data generation and labelling, according to some embodiments.

FIG. 12 is a flowchart showing a process 1200 for data generation and labelling, according to some embodiments. The process 1200 of FIG. 12 can be used, for example, to generate training data that can be used in the row and column disambiguation step 766 of process 1100 in FIG. 11. Alternatively or in addition, the process 1200 of FIG. 12 can generate labeled data that can be learned by a machine learning algorithm. As shown in FIG. 12 a PDF file 770 is generated or received, for example from a document preparation system such as LaTeX (768). Following the upper path, the PDF file 770 is converted into an image file at 772, and an OCR software such as Tesseract is applied to the image file at 774, to detect characters of the image file. At 776, and based on the OCR-processed image file, character-level bounding boxes are detected. Following the lower path, the PDF file 770 is read, at 778, using a PDF text reader, and word-level bounding boxes with row labels and column labels are identified at 780 based on output, generated at 778, from the PDF text reader. For example, the text in each word-level bounding box can include an identification of the row and column associated with that word-level bounding box. By comparing, at 782, the character-level bounding boxes generated at 776 with the word-level bounding boxes generated at 780, the row indices and column indices for each character-level bounding box are identified (784). Steps 772, 774 and 776 can be performed in parallel with, or substantially in parallel with, steps 778 and 780. The character-level bounding boxes generated at 776 and the word-level bounding boxes generated at 780 can collectively be referred to as a "synthetic dataset" (as shown and descried above with reference to FIG. 1). In some implementations of the process 1200 of FIG. 12, the synthetic dataset is generated using 300 PDF tiles 770 for training purposes, 100 PDF files for validation, and 100 PDF files for testing.

Figure 13:
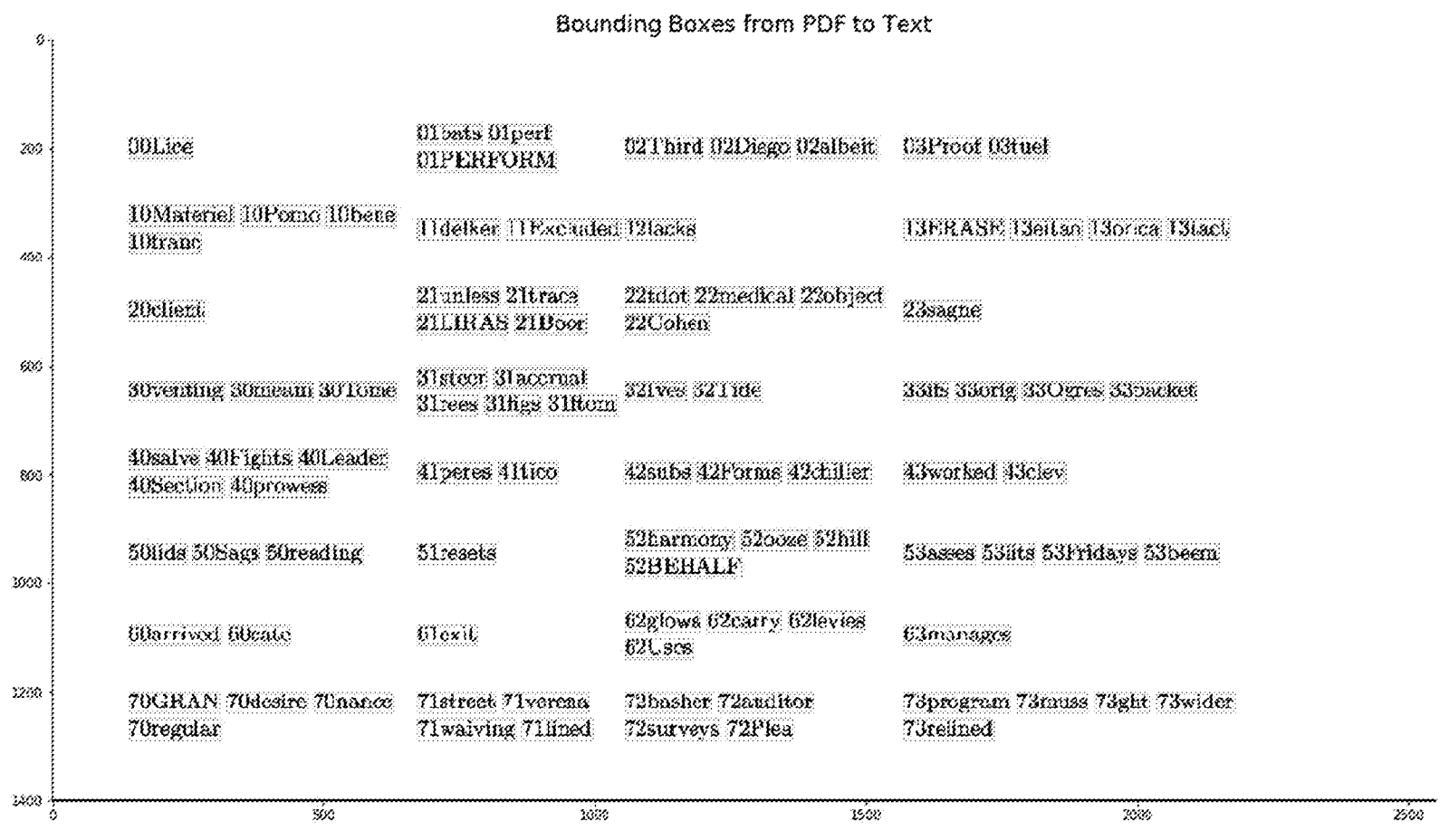

FIG. 13 is a diagram showing word-level bounding boxes generated for a lineless table detected in a PDF file that has been OCR-processed, for example using the process 1200 of FIG. 12, according to some embodiments. As can be observed in FIG. 13, each of multiple word-level bounding boxes (e.g., generated via a process such as step 436 for process 400 in FIG. 4) contains a row identifier (row id) and a column identifier (col id). For example, the first 0 in "00Lice" refers to row 0, and the second 0 in "00Lice" refers to column 0.

Figure 14:
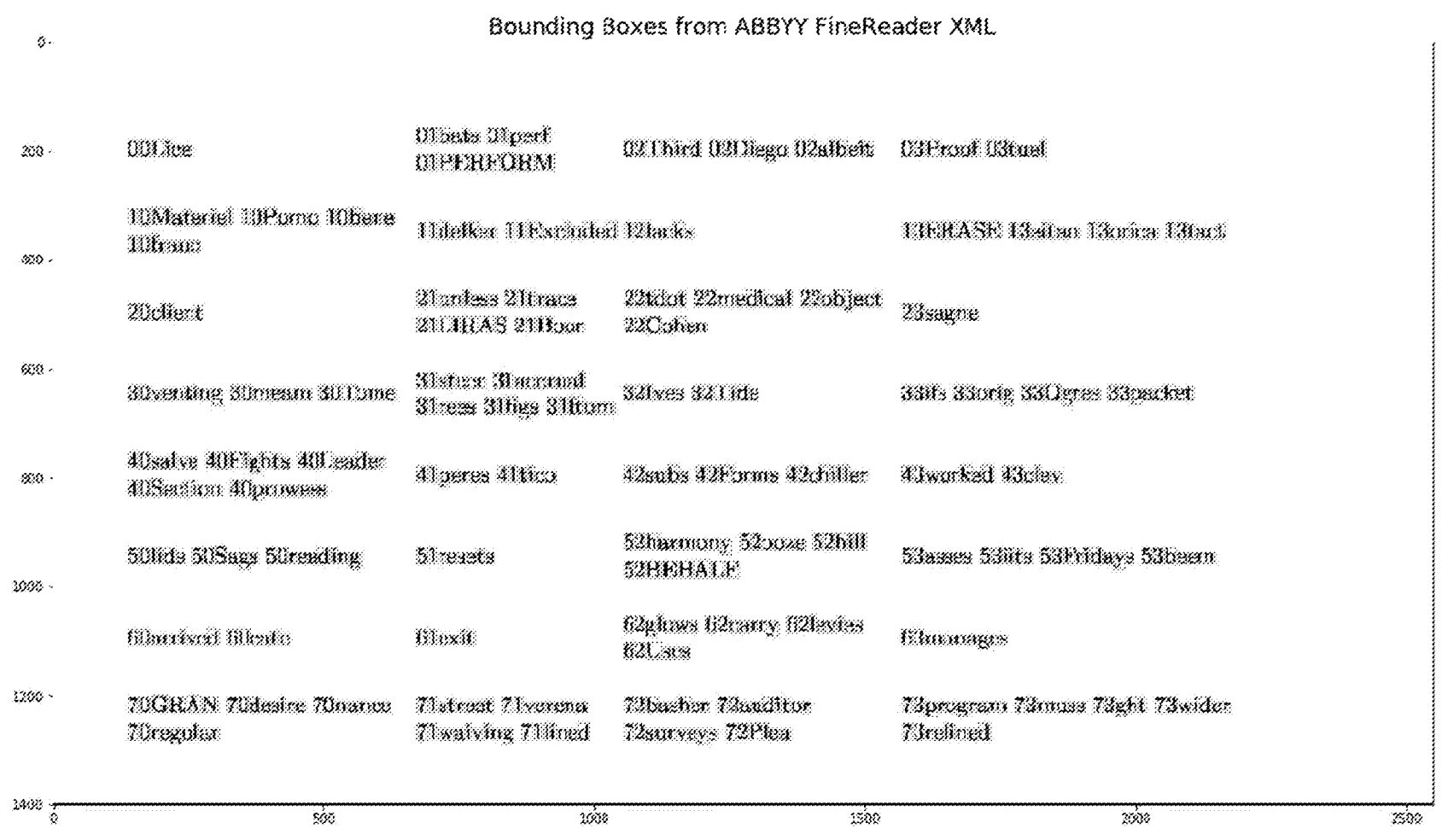

FIG. 14 is a diagram showing character-level bounding boxes generated (e.g., via a process such as step 434 for process 400 in FIG. 4) for the same lineless table as that of FIG. 13, the character-level bounding boxes detected via ABBYY FineReader XML, according to some embodiments. Each character in FIG. 14 is associated with a row id and a cot id of a corresponding word-level bounding box of FIG. 13.

Figure 15:
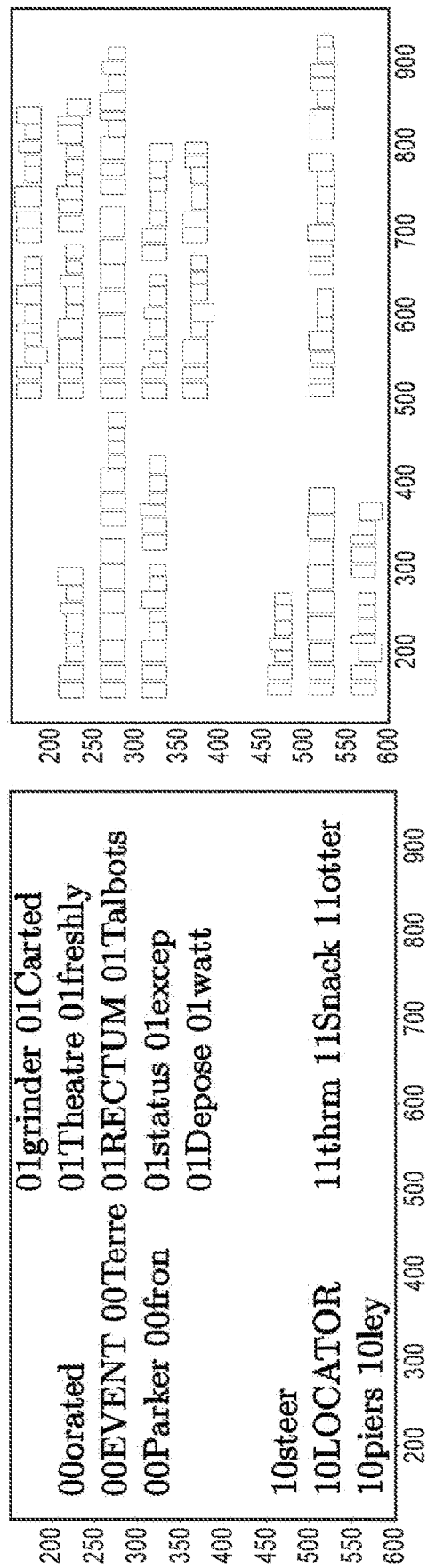
FIG. 15 is a diagram showing an excerpt from a lineless table and an associated arrangement of character-level bounding boxes generated for the lineless table, according to some embodiments.

FIG. 15 is a diagram showing an excerpt from a lineless table and an associated arrangement of character-level bounding boxes generated for the lineless table, according to some embodiments. As can be seen in FIG. 15, the excerpt (on the left) includes two rows and two columns, and the corresponding character-level bounding boxes are shown on the right.

Figure 16:
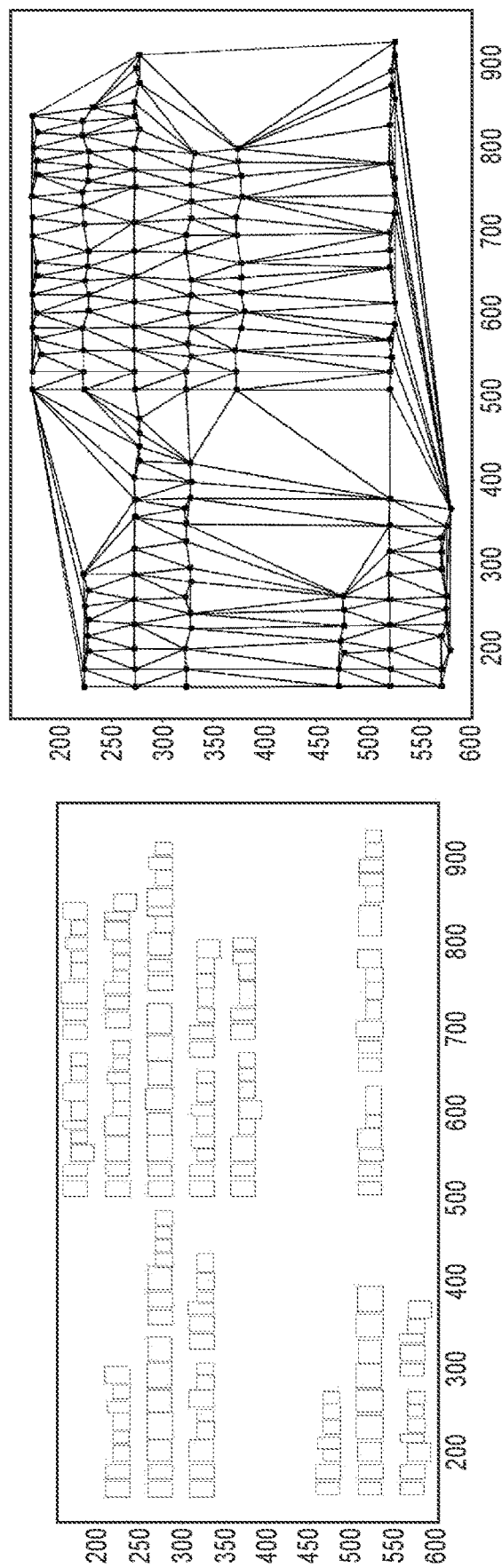
FIG. 16 is a diagram showing the arrangement of character-level bounding boxes of FIG. 15 and an associated graph including nodes and edges, generated using Delaunay triangulation, according to some embodiments.
Figure 17:
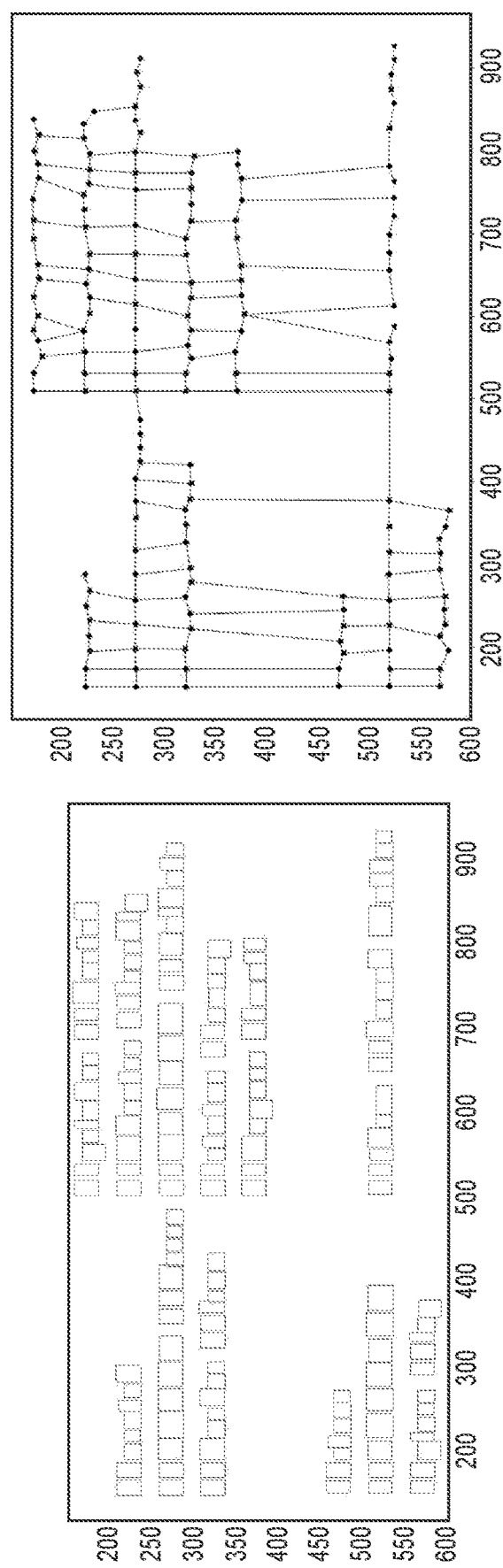
FIG. 17 is a diagram showing the graph of FIG. 16 and an associated reduced graph from which excess edges have been removed, according to some embodiments.

FIG. 16 is a diagram showing the arrangement of character-level bounding boxes of FIG. 15 and an associated graph including nodes and edges, generated using Delaunay triangulation on the nodes and edges, according to some embodiments. FIG. 17 is a diagram showing the graph of FIG. 16 and an associated reduced graph from which excess edges have been removed, according to some embodiments. In some embodiments, edge classification (i.e., the assignment of row labels and column labels) is performed based on the reduced graph. For example, the row and column for each node can be predicted as a categorical variable (classification).

Figure 18:
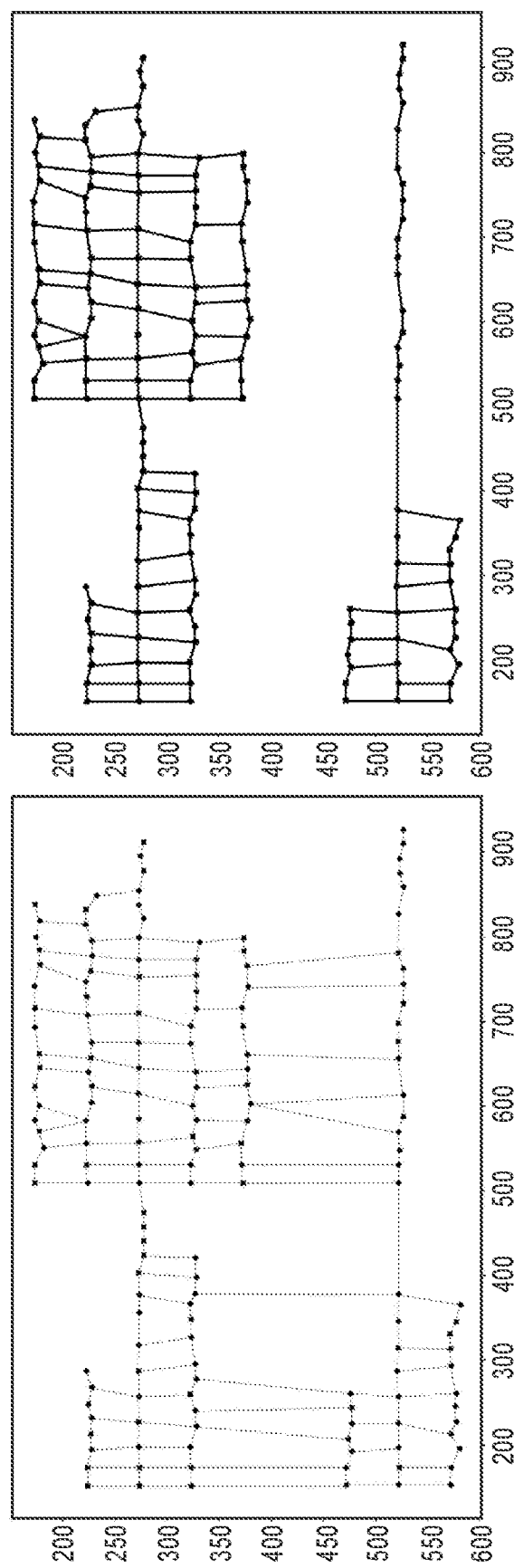
FIG. 18 is a diagram showing the reduced graph of FIG. 17 and an associated further reduced graph from which additional excess edges have been removed based on row detection, according to some embodiments.

FIG. 18 is a diagram showing the reduced graph of FIG. 17 and an associated further reduced graph from which additional excess edges have been removed based on row detection, according to some embodiments. In some embodiments, rows of the table are identified by detecting/locating connected nodes and/or edges. For example, one or more edges can be removed from the further reduced graph if the same-row label of that edge is negative, resulting in two or more disjoint graphs. By tracing the remaining nodes using such an algorithm, rows can be identified. As such, in some embodiments, edge classification (i.e., the assignment of row labels and column labels) can be performed at least in part based on the further reduced graph of FIG. 18.

Figure 19:
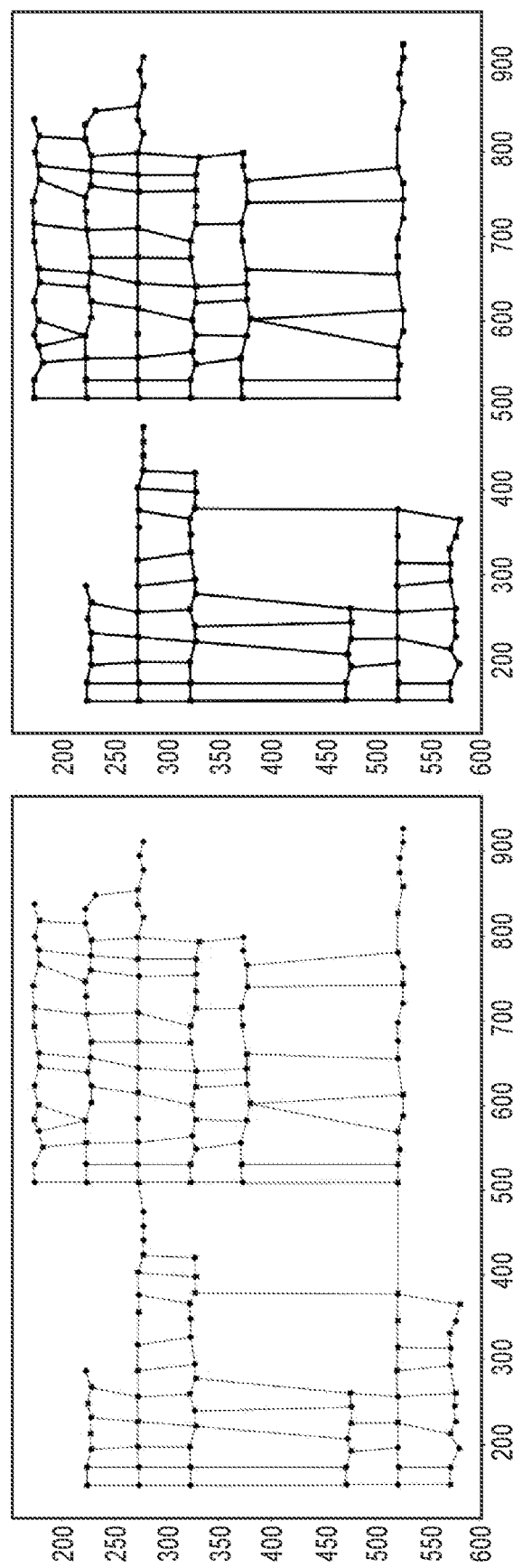
FIG. 19 is a diagram showing the reduced graph of FIG. 17 and an associated further reduced graph from which additional excess edges have been removed based on column detection, according to some embodiments.

FIG. 19 is a diagram showing the reduced graph of FIG. 17 and an associated further reduced graph from which additional excess edges have been removed based on column detection, according to some embodiments. In some embodiments, columns of the table are identified by detecting/locating connected nodes and/or edges. For example, one or more edges can be removed from the further reduced graph if the same-column label of that edge is negative, resulting in two or more disjoint graphs. By tracing the remaining nodes using such an algorithm, columns can be identified. As such, in some embodiments, edge classification (i.e., the assignment of row labels and column labels) can be performed at least in part based on the further reduced graph of FIG. 19. In some embodiments, a graph reduction process can include both the removal of excess edges based on row detection (as shown in FIG. 18) and the removal of excess edges based on column detection (as shown in FIG. 19).

Figure 20:
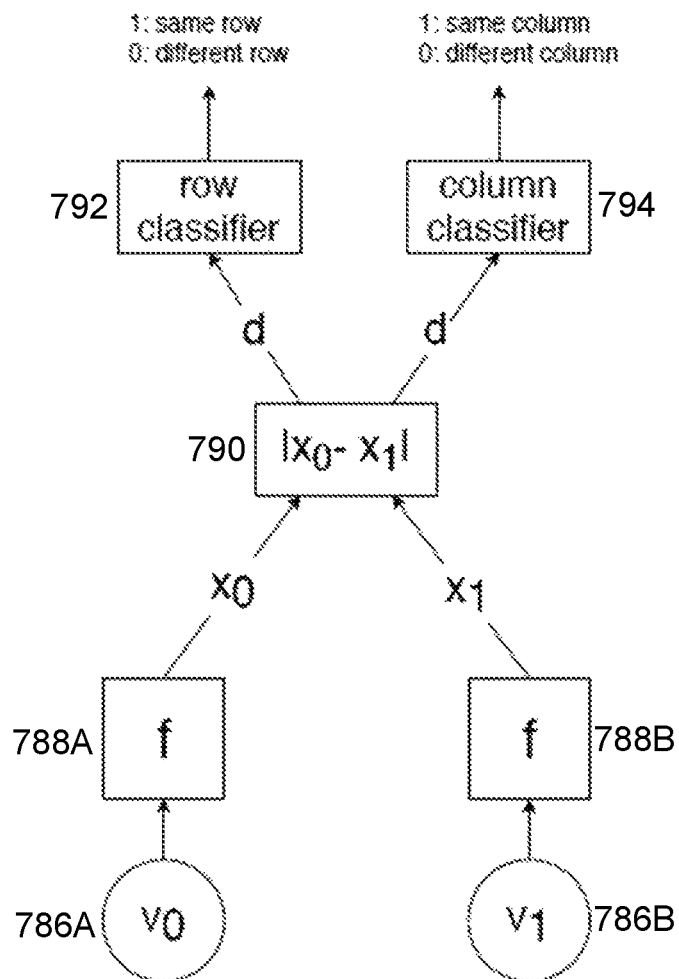
FIG. 20 is a flowchart showing a process for determining the distance between nodes of a lineless table graph, according to some embodiments.

FIG. 20 is a flowchart showing a process for determining the distance between nodes of a lineless table graph, according to some embodiments. Nodes that are closer to one another (e.g., closer than a predefined distance) along a vertical direction may be determined to share a common row, and/or nodes that are closer to one another (e.g., closer than a predefined distance) along a horizontal direction may be determined to share a common column. Similarly, nodes that are further apart from one another (e.g., further than a predefined distance from one another) along a vertical direction may be determined to be in different (and, optionally, adjacent) rows, and/or nodes that are further apart from one another (e.g., further than a predefined distance from one another) along a horizontal direction may be determined to be in different (and, optionally, adjacent) columns. As shown in FIG. 20, beginning at nodes v0 and v1 (786A and 786B, respectively), for example from a graph as generated according to processes described herein, the bounding box associated with node v0 (786A) is transformed by function f at 788A to produce a feature vector $x_0$, and the bounding box associated with node v1 (786B) is transformed by function f at 788B to produce a feature vector $x_1$. The absolute value of the difference between feature vector $x_0$ and feature vector $x_1$ ($|x_0-x_1|$) is calculated as "d" (i.e., the distance between the bounding boxes) at 790, and the value "d" is provided to each of a row classifier 792 and a column classifier 794 for use in determining whether nodes v0 and v1 (786A and 786B, respectively) belong to a common row and/or a common column, respectively. When nodes v0 and v1 are determined to belong to a common row, a common-row label value of "1" or "true" can be assigned to each of nodes v0 and v1 and/or to edges associated therewith. When nodes v0 and v1 are determined not to belong to a common row (and, thus, to belong to different rows), a common-row label value of "0" or "false" can be assigned to each of nodes v0 and v1 and/or to edges associated therewith. When nodes v0 and v1 are determined to belong to a common column, a common-column label value of "1" or "true" can be assigned to each of nodes v0 and v1 and/or to edges associated therewith. When nodes v0 and v1 are determined not to belong to a common column (and, thus, to belong to different columns), a common-column label value of "0" or "false" can be assigned to each of nodes v0 and v1 and/or to edges associated therewith.

In some embodiments, a statistical model for prediction of row and/or column membership of bounding boxes of a lineless table is based on the lengths of edges of the graph generated for that table. In some instances, however, one or more edges have lengths that make classification unclear. To address such instances, in some embodiments, a comparison of a first edge in question to one or more neighboring edges that are at least partially vertically aligned with that edge (e.g., to assist with column classification) or at least partially horizontally aligned with that edge (e.g., to assist with row classification), to check for overlap. Classification of the first edge can then be performed based on whether an overlap has been detected and, optionally, a row and/or column membership of the edge(s) to which the first edge is being compared. In some such implementations, fewer or no edges may be removed from the initially-generated graph based on the bounding boxes. In other words, the graph may undergo fewer reduction or "refinement" steps, so as to preserve additional neighboring edge data within the graph. Alternatively or in addition, a "neighborhood" of an edge can be detected using an algorithm and used in the determination of row labels and/or column labels.

Figure 21:
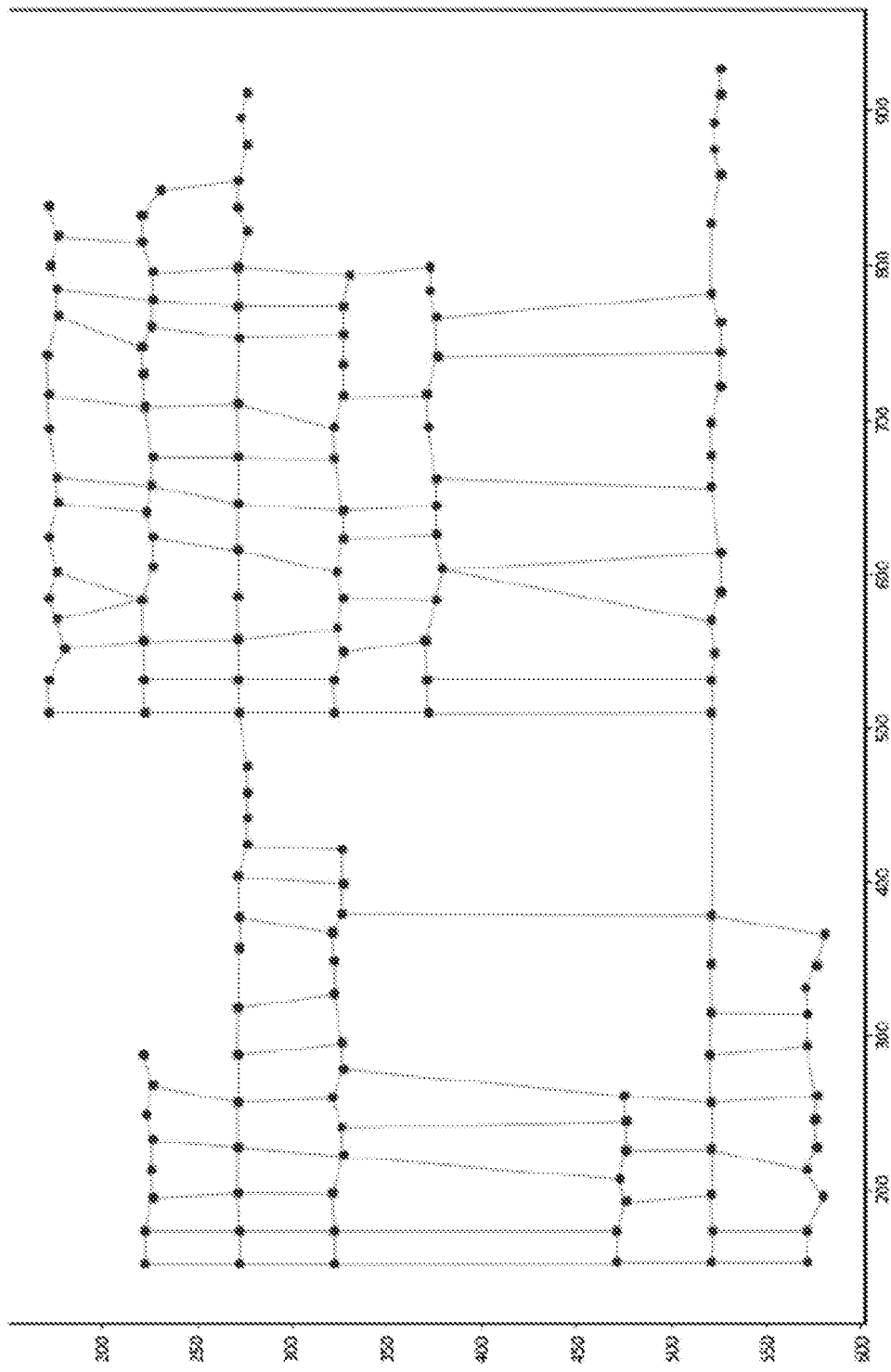
FIG. 21 shows the reduced graph of FIG. 17.
Figure 22:
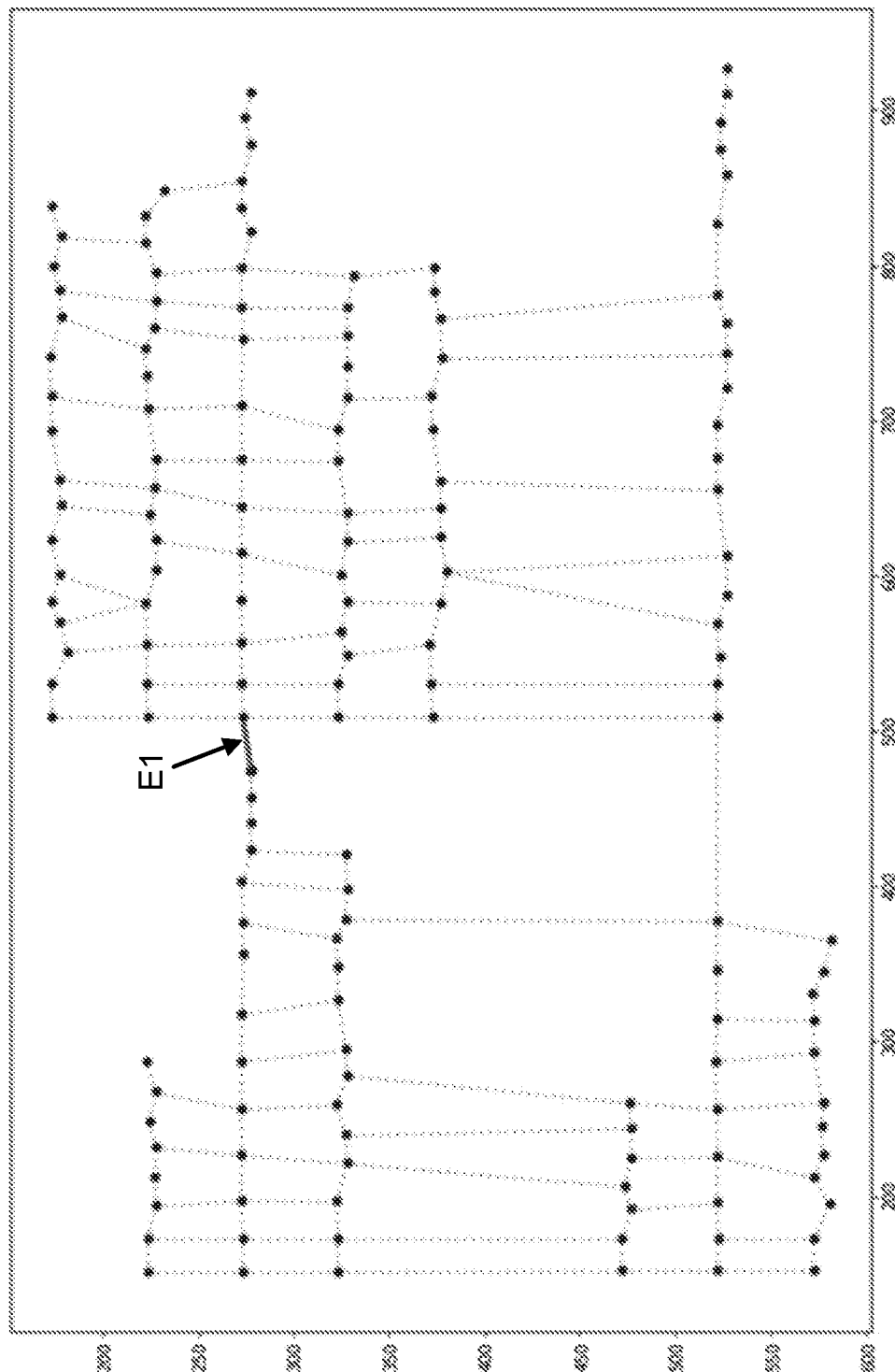
FIG. 22 shows the reduced graph of FIG. 21, with a difficult-to-classify edge identified.
Figure 23:
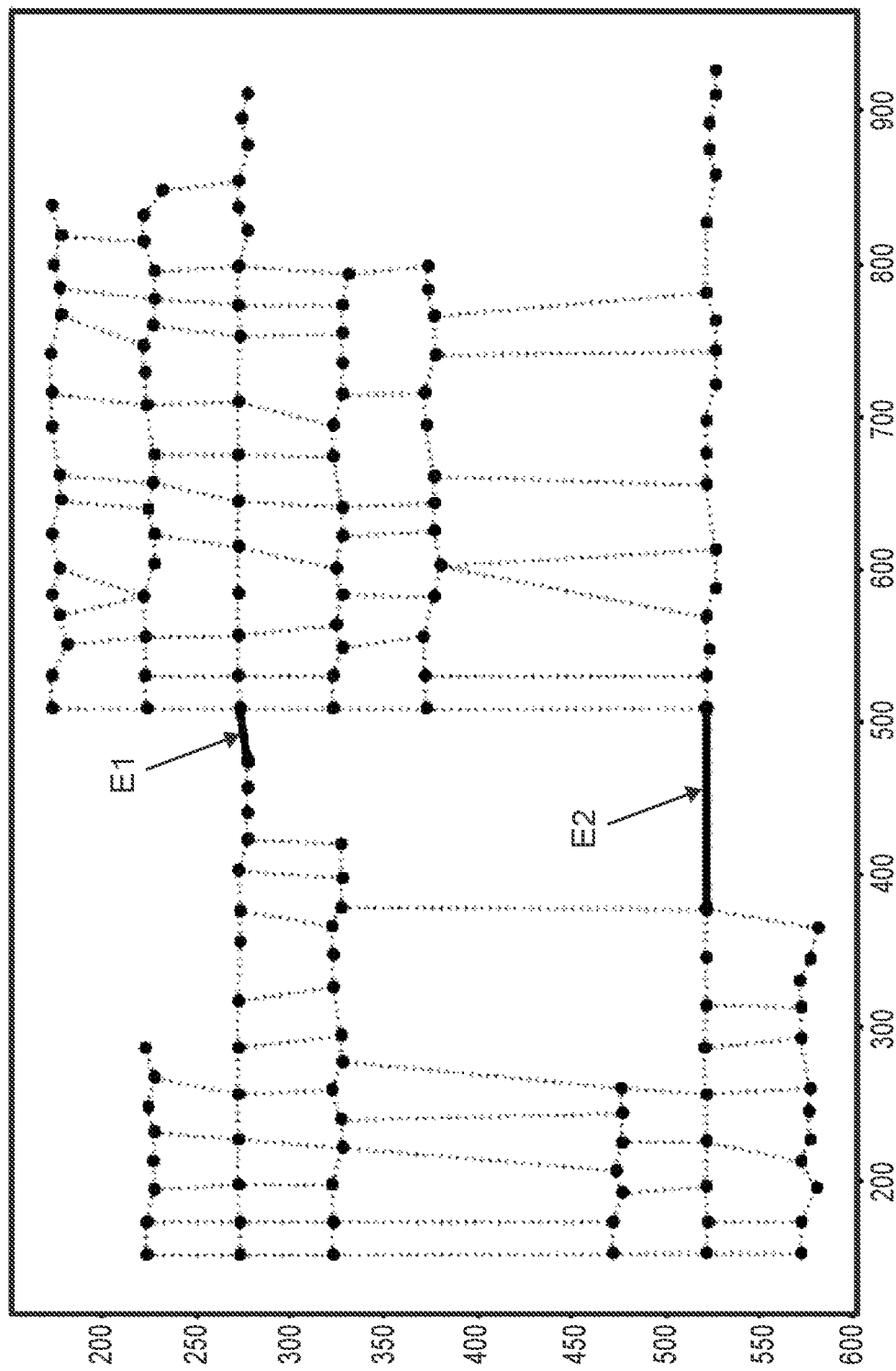
FIG. 23 shows the reduced graph of FIG. 21, with the difficult-to-classify edge and a further edge that is in at least partial vertical alignment with the difficult-to-classify edge identified.

An example of the "difficult to classify" edge scenario described above is illustrated via FIGS. 21-26. FIG. 21 shows the reduced graph of FIG. 17. FIG. 22 shows the reduced graph of FIG. 21, with a difficult-to-classify edge "E1" identified. FIG. 23 shows the reduced graph of FIG. 21, with the difficult-to-classify edge "E1" and a further edge "E2" that is in at least partial vertical alignment with the difficult-to-classify edge identified. The further edge "E2" can be used to assist in the determination of a column assignment (i.e., column classification) for edge "E1." FIG. 24 shows the reduced graph of FIG. 21, with the difficult-to-classify edge "E1" and multiple further edges "E3" that are in at least partial horizontal alignment with the difficult-to-classify edge "E1." The multiple further edges "E3" can be used to assist in the determination of a row assignment (i.e., row classification) for edge "E1."

Figure 24:
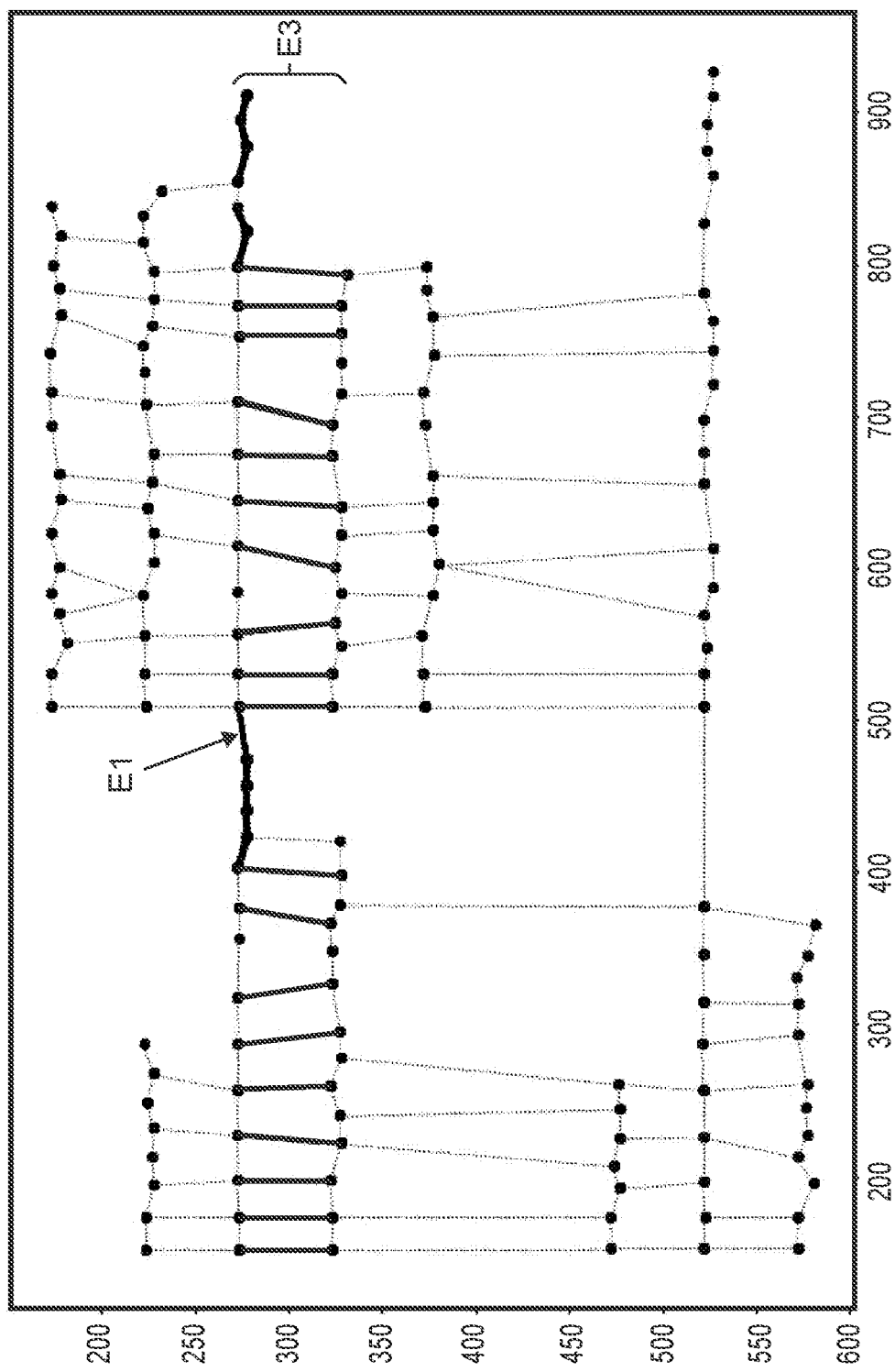
FIG. 24 shows the reduced graph of FIG. 21, with the difficult-to-classify edge and further edges that are in at least partial horizontal alignment with the difficult-to-classify edge identified.
Figure 25:
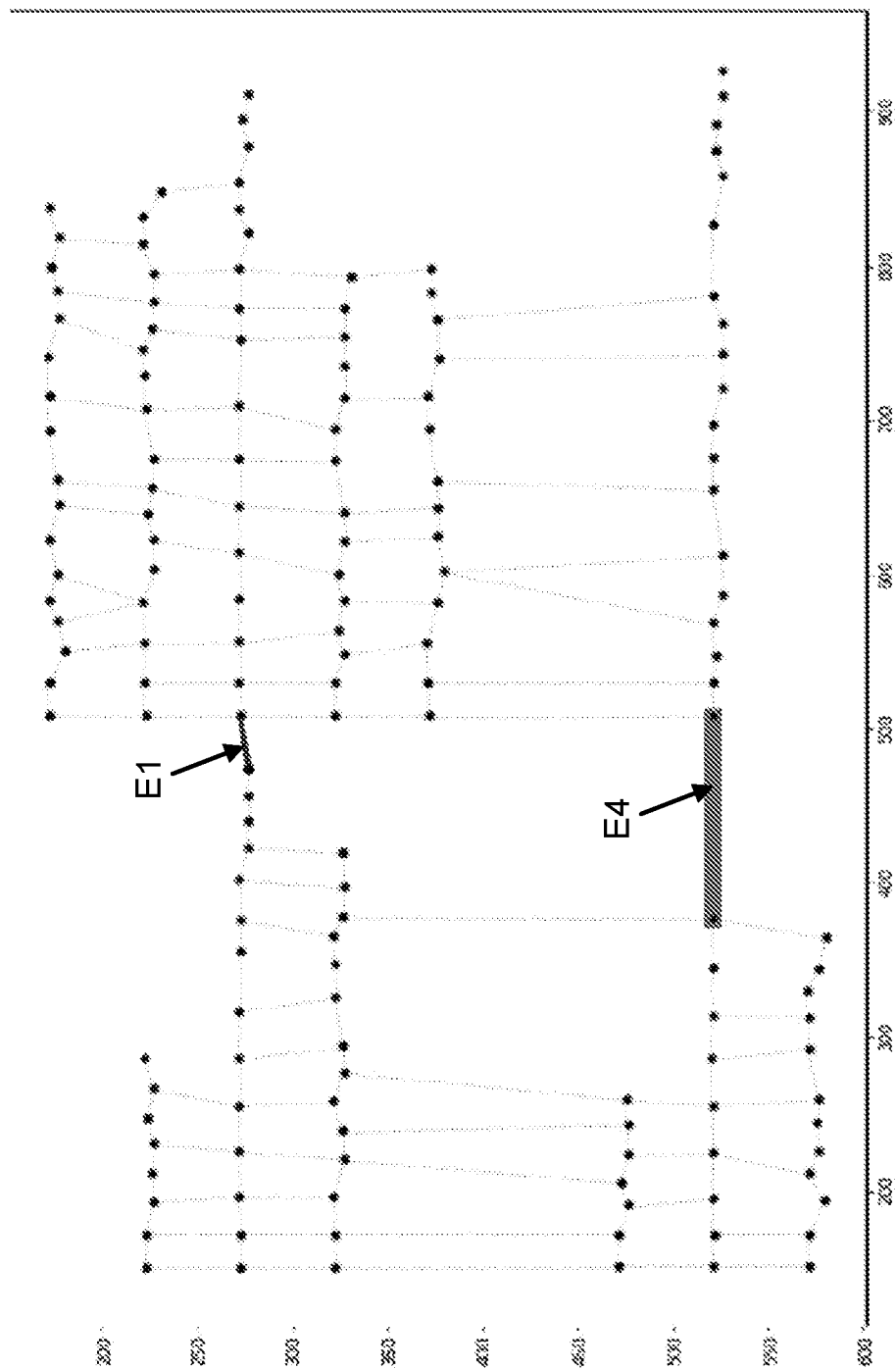
FIG. 25 shows the graph of FIG. 23, including relative importance annotation applied.
Figure 26:
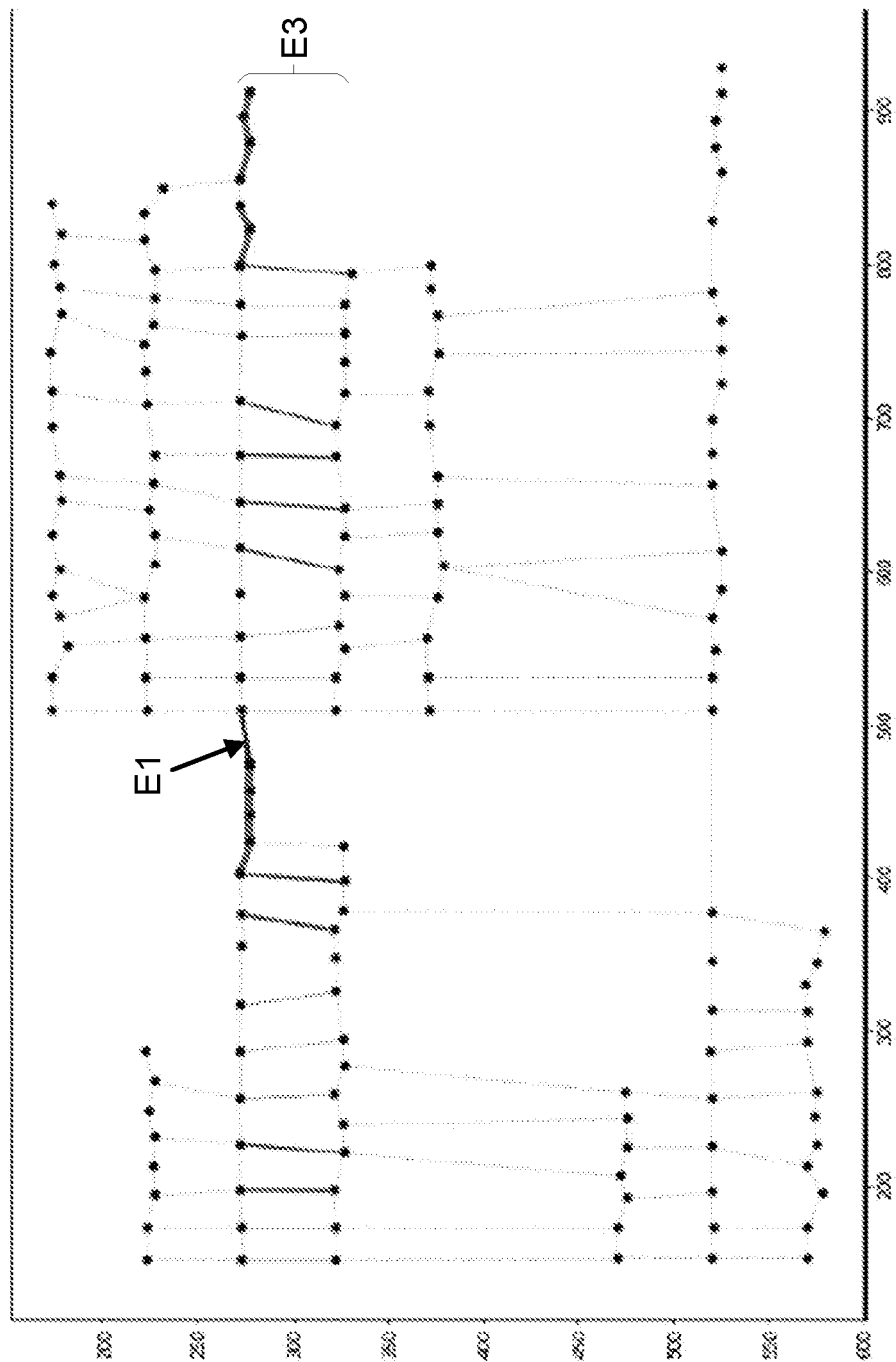
FIG. 26 shows the graph of FIG. 24, including relative importance annotation applied.

FIGS. 25 and 26 are similar to the graphs of FIGS. 23 and 24, respectively, but with relative importance annotation applied. As shown in FIG. 25, for example, a vertically-neighboring edge "E4" has been identified, and has a greater thickness than the thickness of the edge "E2" in FIG. 23. When relative importance annotation is applied, edges having a greater thickness can be more heavily weighted when used in the row and/or column classification of the difficult-to-classify edge "E1."

Figure 27:
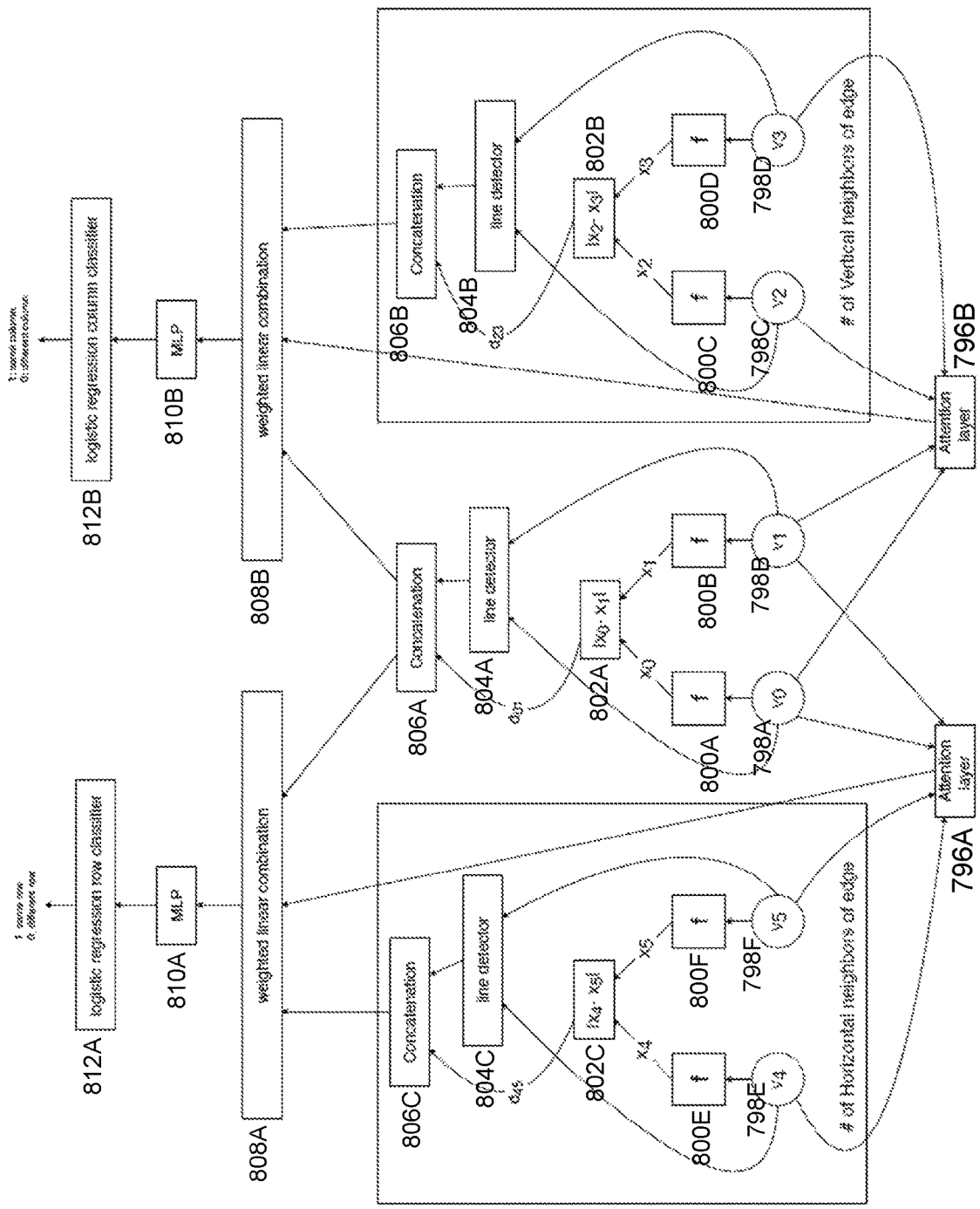
FIG. 27 is a flowchart showing a process for row and column classification for text within a lineless table, according to some embodiments.

FIG. 27 is a flowchart showing a process/model for row and column classification for text within a lineless table, according to some embodiments. As shown in FIG. 27, beginning at nodes v0-v5 (798A through 798F, respectively), for example from a graph as generated according to processes described herein, the bounding box associated with each node is transformed by an associated function "f" (at 800A-800F, respectively) to produce feature vectors $x_0$ through $x_5$. Note that nodes v0 and v1 are associated with an initial edge of a graph for a lineless table being analyzed, nodes v2 and v3 are associated with a vertical nearest-neighbor edge of the initial edge (to inform column classification), and nodes v4 and v5 are associated with a horizontal nearest-neighbor edge of the initial edge (to inform row classification). The absolute values of the differences between each pair of feature vectors ($x_0$ and $x_1$, $x_2$ and $x_3$, and $x_4$ and $x_5$, respectively) are calculated as $d_{01}$, $d_{23}$ and dos (i.e., the distances between the associated bounding boxes) at 802A, 802B and 802C, respectively, and these values are provided as inputs to concatenation algorithms 806A, 806B and 806C, respectively, for use in row and column classification, as shown in FIG. 27. In addition, data associated with each node from each pair of nodes (v0 and v1, v2 and v3, v4 and 5) is provided to an associated line detector (804A, 804B and 804C, respectively) and the outputs of the line detectors 804A-804C are provided as inputs to the concatenation algorithms 806A, 806B and 806C, respectively, for use in row and column classification. In addition, data associated with each node from each pair of nodes (v0 and v1, v2 and v3, v4 and 5) is provided to an associated attention layer (796A or 796B, as shown), and the outputs of the attention layers 796A, 796B (e.g., including weights) are provided to the weighted linear combinations 808A, 808B (respectively). The weighted linear combination 808A thus takes, as its inputs, the output of the concatenation algorithms 806A and 806C and the output of the attention layer 796A, and the weighted linear combination 808B thus takes, as its inputs, the output of the concatenation algorithms 806A and 806B and the output of the attention layer 796B (as shown in FIG. 27). The attention layer can be included in the model, for example to determine long range dependencies and/or relative importance of each edge with respect to one another.

The weighted linear combination generated at 808A is provided to an MLP 810A, and the corresponding MLP output is fed to a logistic regression row classifier 812A. Similarly, the weighted linear combination generated at 808B is provided to an MLP 810B, and the corresponding MLP output is fed to a logistic regression row classifier 812B. Similar to the discussion of FIG. 20, when nodes of a pair of nodes are determined to belong to a common row, a common-row label value of "1" or "true" can be assigned to each node within that pair of nodes and/or to edges associated therewith. When nodes of a pair of nodes are determined not to belong to a common row (and, thus, to belong to different rows), a common-row label value of "0" or "false" can be assigned to node within that pair of nodes and/or to edges associated therewith. When nodes of a pair of nodes are determined to belong to a common column, a common-column label value of "1" or "true" can be assigned to each node within that pair of nodes and/or to edges associated therewith. When nodes of a pair of nodes are determined not to belong to a common column (and, thus, to belong to different columns), a common-column label value of "0" or "false" can be assigned to node within that pair of nodes and/or to edges associated therewith. The large rectangular boxes represent plate notation for graphical models. Each plate can be replicated, for example for different/additional neighboring edges. Although the model of FIG. 27 includes line detectors 804A-804C, in some implementations no line detector is used, Although the model of FIG. 27 includes MLPs 810A and 810B, alternatively or in addition one or more other types of neural networks are used. In some implementations of the model of FIG. 27, a K-nearest-neighbor graph can be included.

Figure 28:
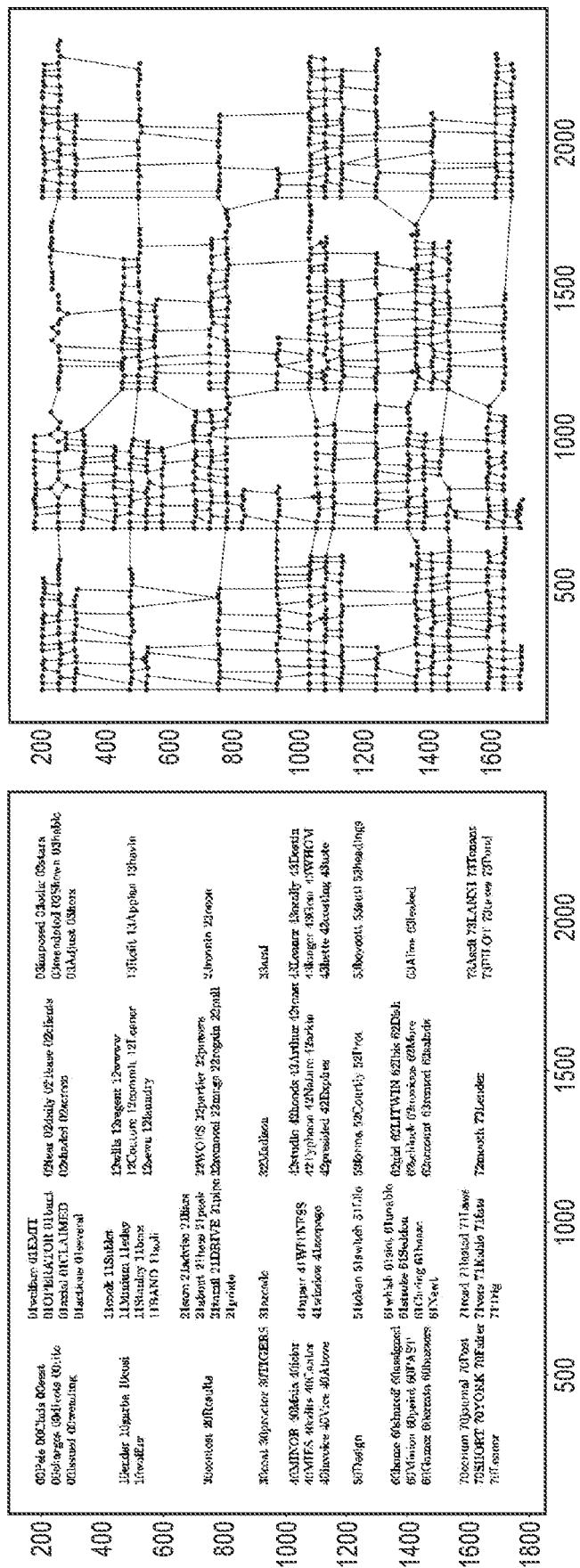
FIG. 28 is a diagram showing an excerpt from a lineless table and an associated graph generated using the process of FIG. 27, according to some embodiments.
Figure 29:
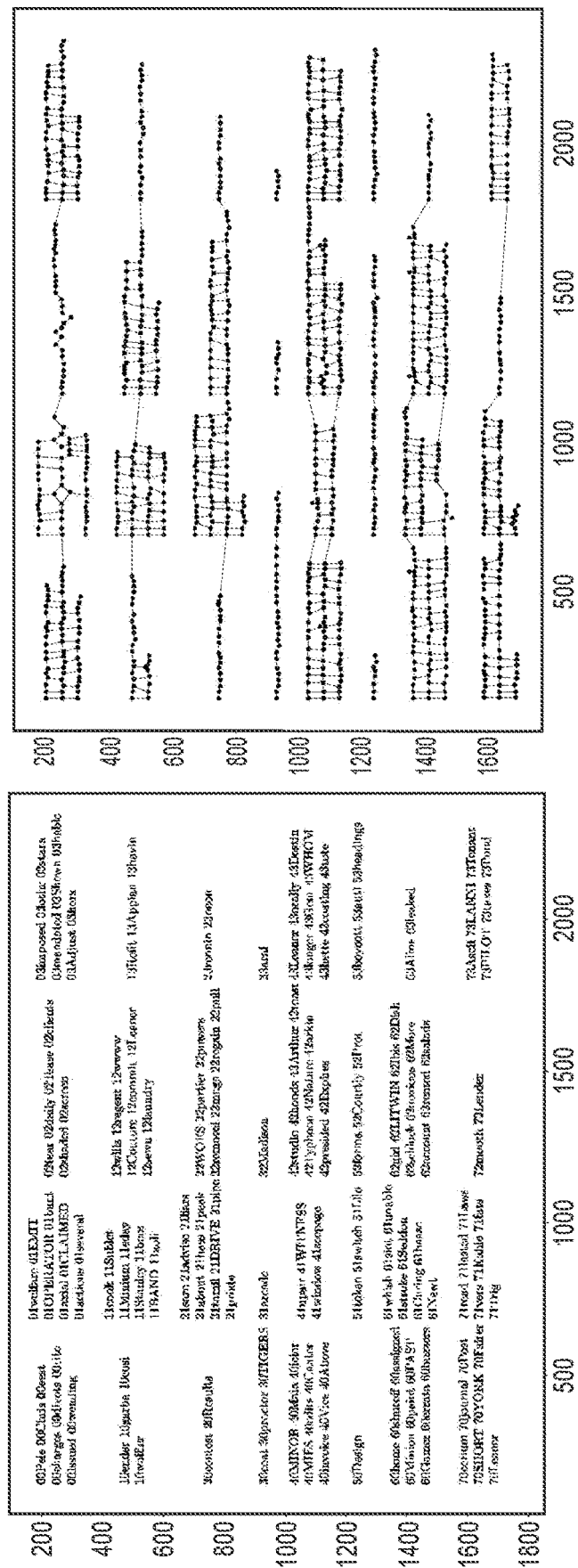
FIG. 29 is a diagram showing the excerpt of FIG. 28 and an associated reduced graph, showing detected rows, generated using the process of FIG. 27.
Figure 30:
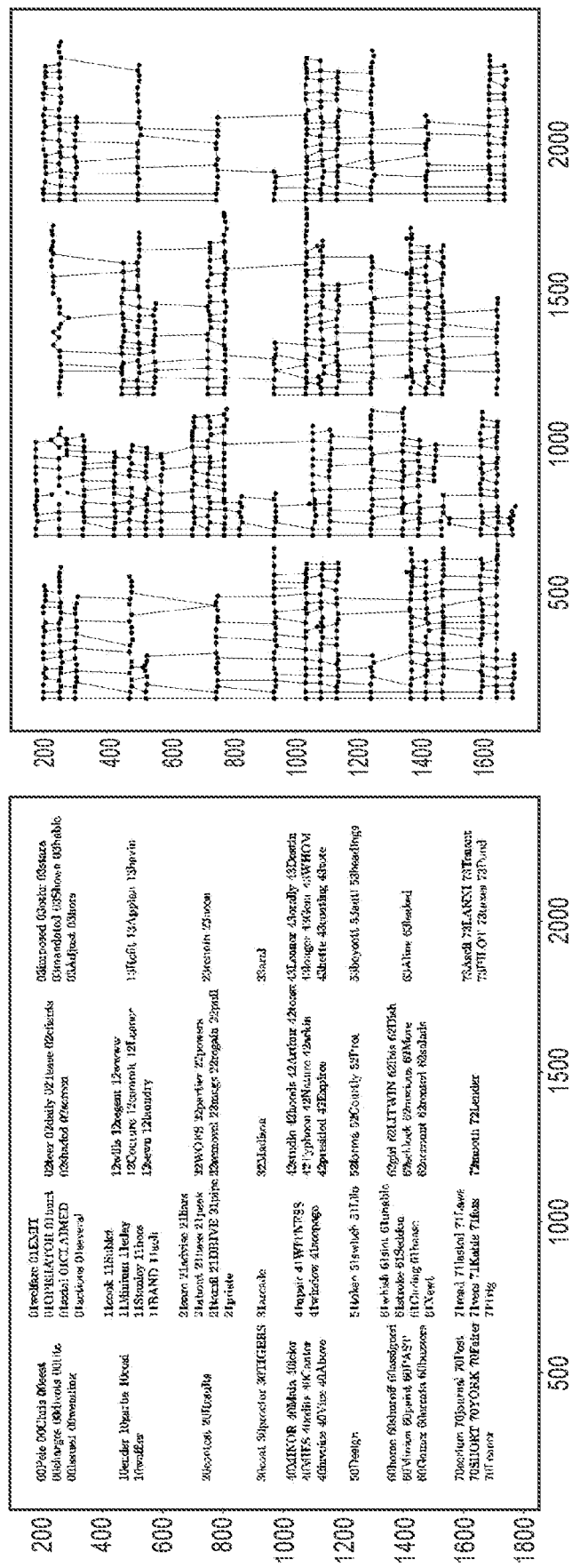
FIG. 30 is a diagram showing the excerpt of FIG. 28 and an associated reduced graph, showing detected columns, generated using the process of FIG. 27.
Figure 31:
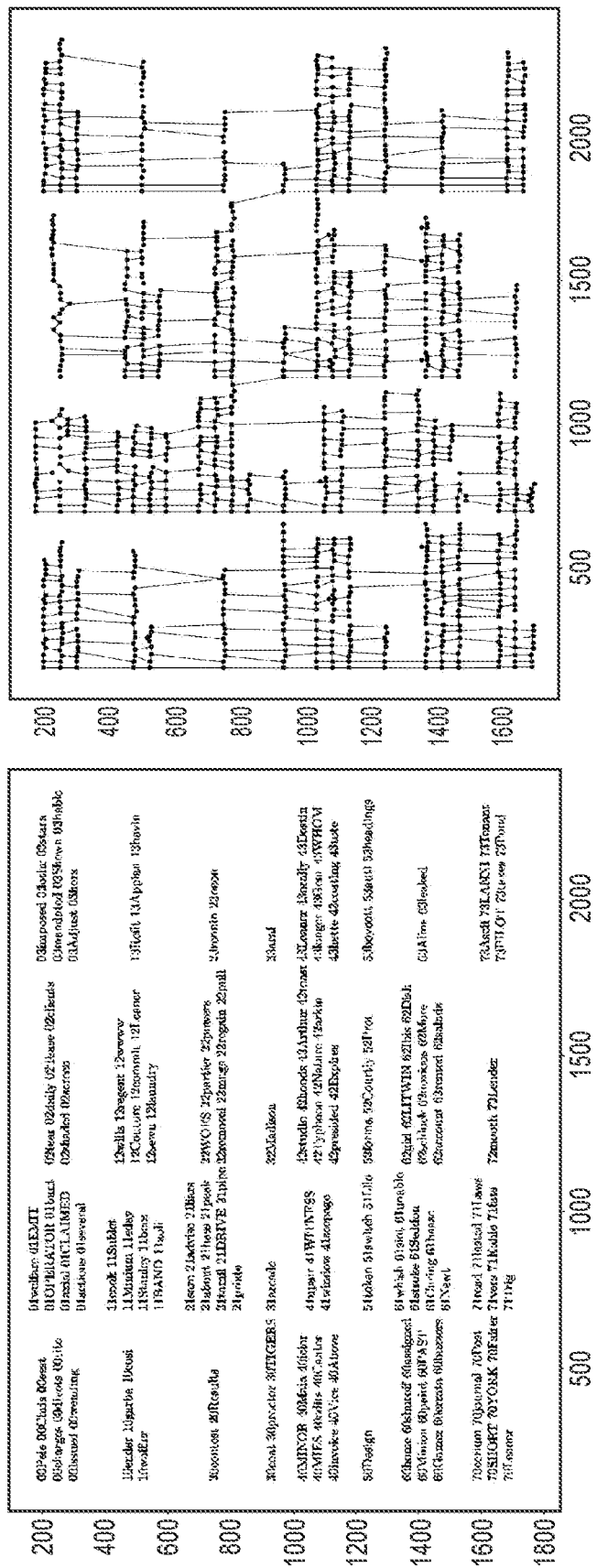
FIG. 31 is a diagram showing the excerpt of FIG. 28 and an associated reduced graph, showing detected columns, generated without using an attention mechanism.

FIG. 28 is a diagram showing an excerpt from a lineless table (processed, and thus including indices/prefixes appended to the data, as shown) and an associated graph generated using the process of FIG. 27, according to some embodiments. FIG. 29 is a diagram showing the excerpt of FIG. 28 and an associated reduced graph, showing detected rows, generated using the process of FIG. 27. FIG. 30 is a diagram showing the excerpt of FIG. 28 and an associated reduced graph, showing detected columns, generated using the process of FIG. 27. FIG. 31 is a diagram showing the excerpt of FIG. 28 and an associated reduced graph, showing detected columns, generated using a process similar to the process of FIG. 27 but without using an attention mechanism.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. They are presented to assist in understanding and teach the embodiments.

It should be understood that they are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method, comprising:
    storing, in a memory, an image including a table;
    identifying, via a processor operably coupled to the memory, a plurality of text-based characters in the table;
    defining, via the processor, a plurality of bounding boxes based on the plurality of text- based characters, each bounding box from the plurality of bounding boxes uniquely associated with at least one text-based character from the plurality of text-based characters;
    generating, via the processor, a graph including a plurality of nodes and a plurality of edges, based on the bounding boxes, using a graph construction algorithm; and
    causing prediction of a plurality of row labels and a plurality of column labels for the table based on the graph.

2. The method of claim 1, wherein causing includes causing a statistical prediction of the plurality of row labels and the plurality of column labels for the table based on the graph.

3. The method of claim 1, wherein the generating the graph includes generating each node from the plurality of nodes based on a midpoint of an associated bounding box from the plurality of bounding boxes.

4. The method of claim 1, further comprising receiving the predicted plurality of row labels and the predicted plurality of column labels for the table.

5. The method of claim 4, further comprising generating at least one format line for the table based on the predicted plurality of row labels and the predicted plurality of column labels.

6. The method of claim 1, wherein the image of the table is from at least one of a receipt or an invoice.

7. A method, comprising:
    receiving, at a processor, a scanned image including lineless formatted data;
    detecting, via optical character recognition (OCR), a plurality of boundary boxes associated with the lineless formatted data;
    generating a graph based on the plurality of boundary boxes, the graph including a plurality of edges, each edge from the plurality of edges representing a relationship between exactly two boundary boxes from the plurality of boundary boxes; and
    causing a prediction of row data and column data for the lineless formatted data based on the graph.

8. The method of claim 7, further comprising generating at least one format line for the scanned image based on the predicted row data and column data.

9. The method of claim 7, wherein the predicting the row data and column data for the lineless formatted data includes predicting a row of the lineless formatted data based on a property of at least one horizontally-oriented edge from the plurality of edges.

10. The method of claim 7, wherein the predicting the row data and column data for the lineless formatted data includes predicting a column of the lineless formatted data based on a property of at least one vertically-oriented edge from the plurality of edges.

11. The method of claim 7, further comprising generating a pair of format classification labels for each edge from the plurality of edges based on the predicted row data and column data, each pair of format classification labels representing whether or not the two boundary boxes associated with that edge are in a common row or a common column.

12. The method of claim 7, further comprising generating format classification labels for each edge from the plurality of edges using statistical prediction, the format classification labels representing whether or not the two boundary boxes associated with that edge are in a common row or a common column.

13. The method of claim 7, further comprising generating format classification labels for each edge from the plurality of edges based at least on a length of that edge.

14. The method of claim 7, further comprising generating format classification labels for each edge from the plurality of edges based at least on a neighborhood of that edge, the neighborhood being defined based on an overlap between that edge and another edge from the plurality of edges.

15. A method, comprising:
    obtaining, at a processor, a portable document format (PDF) file including formatted data;
    converting the PDF file, via the processor, to an image file;
    performing optical character recognition (OCR) on the image file, via the processor, to produce a scanned file;
    generating, via the processor, a plurality of character-level bounding boxes for the formatted data based on the scanned file; and
    generating, via the processor, a plurality of word-level bounding boxes for the formatted data based on the PDF file, the plurality of character-level bounding boxes and the plurality of word-level bounding boxes forming a dataset.

16. The method of claim 15, further comprising:
    comparing the plurality of character-level bounding boxes to the plurality of word-level bounding boxes;
    generating a plurality of row labels for the formatted data based on the comparison of the plurality of character-level bounding boxes to the plurality of word-level bounding boxes; and
    generating a plurality of column labels for the formatted data based on the comparison of the plurality of character-level bounding boxes to the plurality of word-level bounding boxes.

17. The method of claim 15, further comprising predicting at least one of a row membership or a column membership for each word from a plurality of words associated with the word-level bounding boxes of the dataset.

18. The method of claim 15, further comprising determining at least one of a row membership or a column membership for each word from a plurality of words associated with the word-level bounding boxes of the dataset using a statistical prediction.

19. The method of claim 15, further comprising generating a graph including a plurality of nodes and a plurality of edges, based on at least one of the plurality of character-level bounding boxes or the plurality of word-level bounding boxes, using a graph construction algorithm.

20. The method of claim 15, further comprising:
    generating a graph including a plurality of nodes and a plurality of edges; and
    generating format classification labels for each edge from the plurality of edges based at least on a neighborhood of that edge, the neighborhood being defined based on an overlap between that edge and another edge from the plurality of edges.

* * * * *